US010901284B2

(12) United States Patent
Turner et al.

(10) Patent No.: US 10,901,284 B2
(45) Date of Patent: Jan. 26, 2021

(54) FLEXIBLE AND MULTILAYER ELECTROCHROMIC DEVICES AND METHODS OF MAKING THE SAME

(71) Applicant: Kinestral Technologies, Inc., South San Francisco, CA (US)

(72) Inventors: Howard Turner, South San Francisco, CA (US); Howard Bergh, South San Francisco, CA (US); John Bass, South San Francisco, CA (US); Daniel Giaquinta, South San Francisco, CA (US)

(73) Assignee: KINESTRAL TECHNOLOGIES, INC, Hayward, CA (US)

( * ) Notice: Subject to any disclaimer, the term of this patent is extended or adjusted under 35 U.S.C. 154(b) by 183 days.

(21) Appl. No.: 15/970,676

(22) Filed: May 3, 2018

(65) Prior Publication Data

US 2018/0364541 A1   Dec. 20, 2018

Related U.S. Application Data

(60) Provisional application No. 62/500,984, filed on May 3, 2017.

(51) Int. Cl.
*G02F 1/153* (2006.01)
*G02F 1/155* (2006.01)

(52) U.S. Cl.
CPC ............ *G02F 1/1533* (2013.01); *G02F 1/155* (2013.01); *G02F 2001/1536* (2013.01); *G02F 2001/1552* (2013.01); *G02F 2201/16* (2013.01); *G02F 2201/501* (2013.01); *G02F 2202/36* (2013.01)

(58) Field of Classification Search
CPC ............... G02F 1/1533; G02F 1/155; G02F 2001/1536; G02F 2001/1552; G02F 2201/16; G02F 2201/001; G02F 2202/36
See application file for complete search history.

(56) References Cited

U.S. PATENT DOCUMENTS

| 5,532,869 | A | * | 7/1996 | Goldner | G02F 1/1533 359/275 |
|---|---|---|---|---|---|
| 6,094,292 | A | * | 7/2000 | Goldner | E06B 9/24 359/265 |
| 8,643,930 | B2 | * | 2/2014 | Gillaspie | G02F 1/1525 359/265 |
| 2009/0323161 | A1 | * | 12/2009 | Fuss | G02F 1/1533 359/275 |
| 2014/0043668 | A1 | * | 2/2014 | Bergh | G02F 1/153 359/265 |
| 2014/0204445 | A1 | * | 7/2014 | Choi | G02F 1/1523 359/275 |

* cited by examiner

*Primary Examiner* — Joseph P Martinez
(74) *Attorney, Agent, or Firm* — Womble Bond Dickinson (US) LLP

(57) ABSTRACT

A monolithic tandem electrochromic device, comprising a central transparent conductor ion blocking layer, a first electrochromic multilayer stack arranged on a first surface of the central transparent conductor ion blocking layer, and a second electrochromic multilayer stack arranged on a second surface of the central transparent conductor ion blocking layer is described. The central transparent conductor ion blocking layer can comprise ion conductivities between $10^{-4}$ and $10^{-20}$ S/cm, and electrical resistivity less than 100 Ohm-cm.

21 Claims, 11 Drawing Sheets

FLEXIBLE AND MULTILAYER ELECTROCHROMIC DEVICES AND METHODS OF MAKING THE SAME

BACKGROUND

Electrochromic (EC) devices, such as EC windows or automotive EC rearview mirrors, change transmissivity with application of voltage and current. The process relies on electrochemical redox (reduction, or gain of electrons and decrease in oxidation state, and oxidation, or loss of electrons and increase in oxidation state) reactions of a material, and is reversible. Cathodic EC materials color or darken cathodically by a reduction process (i.e., when gaining electrons) and bleach when giving up electrons. Anodic EC materials color or darken anodically by an oxidation process (i.e., when giving up electrons) and bleach when gaining electrons. Ion transmissive (i.e., ion conductive) materials allow ions to travel from one type of EC material to another. Some EC stacks use a cathodic EC material, an ion transmissive material and an anodic EC material.

EC device technology has been difficult to scale to large size window glass for architectural or transportation usage. This is because in larger scale EC devices an "iris" effect is pronounced, where the device changes color more quickly towards the outside edge and more slowly towards the center of the device. This is not appealing to use in buildings, or in transportation vehicles using larger substrates such as automotive window, buses, trains, or boats. Additionally, larger scale EC devices have slow switching speeds when transitioning between states.

EC devices are typically manufactured on glass substrates, and manufacturing methods for typical EC materials are not suitable for other substrate materials, such as flexible materials with significantly lower melting points than glass. Additionally, standard transparent electrically conductive materials used in EC devices (e.g., transparent conductive oxides (TCOs) such as indium tin oxide, or fluorine doped tin oxide) require high processing temperatures to achieve a combination of low electrical resistance and high transparency. When these standard transparent conductor materials are employed on flexible substrates with limited processing temperatures, then the resistance is higher and/or the transparency is lower. The higher resistance of the electrically conductive layer exacerbates the iris effect because the resistance between the edge and center of the device is larger.

Many of the historical EC devices also have drawbacks in their coloration properties. Often the dark state of an EC device (e.g., for use in an automotive application, or an architectural window) has a distinctly blue color and the clear state is hazy or has a yellow color. This problem is caused by the EC materials in the device absorbing light preferentially in one portion of the spectrum. One solution to mitigate the undesirable color of EC devices is to incorporate a colored filter into the device to offset the color of the EC material and produce a neutral colored device. However, this solution has the undesirable consequence of reducing the overall transparency of the device in the clear state, because the filter operates by absorbing incident light in a portion of the spectrum.

Due to their insufficient coloration properties, EC devices have not commonly been used for privacy applications where the exterior or interior windows or partitions are required to substantially prevent others from seeing through the window and distinguish people or objects on the other side. Polymer dispersed liquid crystal (PDLC) and suspended particle display (SPD) technologies have been used in privacy applications. Each of these technologies has drawbacks. PDLC has to be turned off for up to four hours a day for rejuvenation, which is an inconvenience to users and makes the technology impractical for many applications. Additionally, PDLC has a hazy clear state making it impractical for applications where transparent windows are desired. Another drawback to the PDLC technology is that if a PDLC device loses power it will not stay in its state, meaning that if it is tinted for privacy it will no longer provide privacy and become translucent. Also, PDLC devices only have two states, either on or off, switching between an opaque privacy state and a translucent state. Suspended particle devices (SPD) are limited to a blueish color in the dark state. Both PDLC and SPD technologies require constant electricity to maintain their state, which is not energy efficient.

BRIEF DESCRIPTION OF THE DRAWINGS

To facilitate further description of the embodiments, the following drawings are provided in which.

Figure 1:
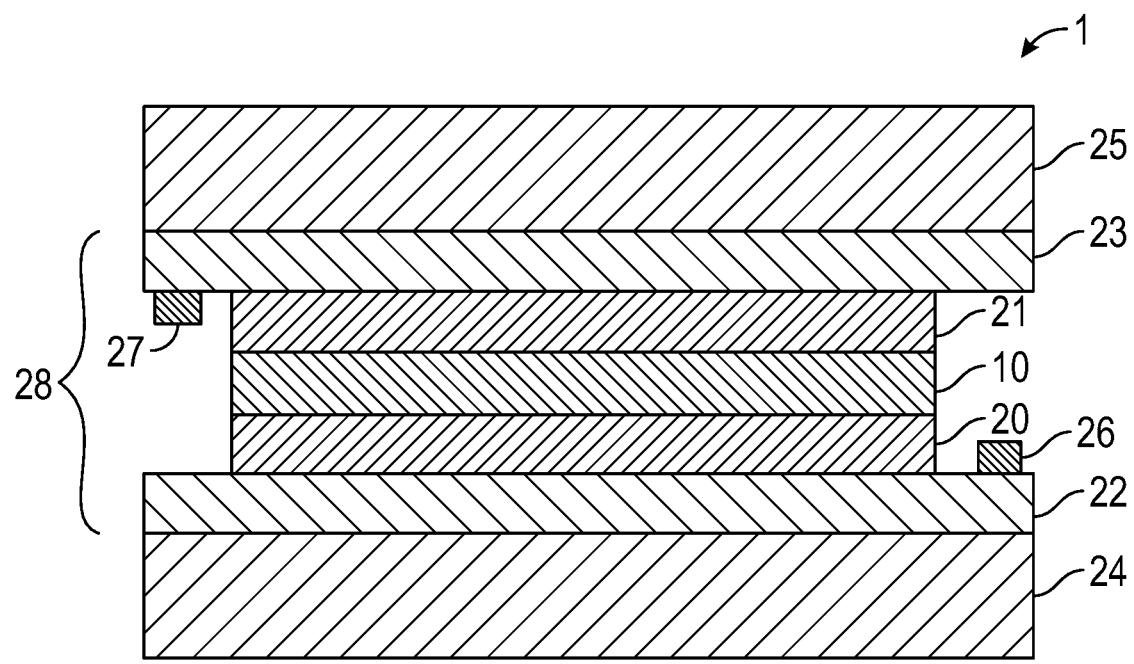
FIG. 1 depicts a cross-sectional structural diagram of electrochromic (EC) device.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

Abbreviations and Definitions

The following definitions are provided to better define the embodiments of the present disclosure and to guide those of ordinary skill in the art in the practice of the present disclosure. Unless otherwise noted, terms are to be understood according to conventional usage by those of ordinary skill in the relevant art.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that an activity, process, method, system, article, device, or apparatus that comprises a list of elements is not necessarily limited to those elements, but may include other elements not expressly listed or inherent to such activity, process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

The terms "couple," "coupled," "couples," "coupling," and the like should be broadly understood and refer to connecting two or more elements or signals, electrically, ionically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time (e.g., permanent or semi-permanent or only for an instant).

"Electrical coupling" and the like should be broadly understood and include coupling involving any electrical signal, whether a power signal, a data signal, and/or other types or combinations of electrical signals.

"Ionic coupling" and the like should be broadly understood and include coupling involving or permitting the transfer of ions between discrete layers or compositions.

"Mechanical coupling" and the like should be broadly understood and include mechanical coupling of all types.

The absence of the word "removably," "removable," and the like near the word "coupled," and the like does not mean that the coupling, etc. in question is or is not removable.

The terms "anodic electrochromic layer" and "anodic electrochromic material" refer to an electrode layer or electrode material, respectively, that upon the removal of ions and electrons becomes less transmissive to electromagnetic radiation.

The term "bleach" refers to the transition of an electrochromic material from a first optical state to a second optical state wherein the first optical state is less transmissive than the second optical state.

The term "bleached state voltage" refers to the open circuit voltage (Voc) of the anodic electrochromic layer versus Li/Li+ in an electrochemical cell in a propylene carbonate solution containing 1M lithium perchlorate when the transmissivity of said layer is at 95% of its "fully bleached state" transmissivity.

The terms "cathodic electrochromic layer" and "cathodic electrochromic material" refer to an electrode layer or electrode material, respectively, that upon the insertion of ions and electrons becomes less transmissive to electromagnetic radiation.

The term "coloration efficiency" or "CE" refers to a property of an electrochromic layer that quantifies how a layer's optical density changes as a function of its state of charge. CE can vary significantly depending on layer preparation due to differences in structure, material phases, and/or composition. These differences affect the probability of electronic transitions that are manifest as color. As such, CE is a sensitive and quantitative descriptor of an electrochromic layer encompassing the ensemble of the identity of the redox centers, their local environments, and their relative ratios. CE is calculated from the ratio of the change in optical absorbance to the amount of charge density passed. In the absence of significant changes in reflectivity, this wavelength dependent property can be measured over a transition of interest using the following equation:

$$CE_\lambda = \frac{\log_{10}\left(\frac{T_{ini}}{T_{final}}\right)}{Q_A}$$

where $Q_A$ is the charge per area passed, $T_{ini}$ is the initial transmission, and $T_{final}$ is the final transmission. For anodically coloring layers this value is negative, and may also be stated in absolute (non-negative) values. A simple electro-optical setup that simultaneously measures transmission and charge can be used to calculate CE. Alternatively, the end transmission states can be measured ex situ before and after electrical switching. CE is sometimes alternatively reported on a natural log basis, in which case the reported values are approximately 2.3 times larger.

The term "darken" refers to the transition of an electrochromic material from a first optical state to a second optical state wherein the first optical state is more transmissive than the second optical state.

The term "electrochromic material" refers to materials that change in transmissivity to electromagnetic radiation, reversibly, as a result of the insertion or extraction of ions and electrons. For example, an EC material may change between a colored, translucent state and a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode assembly.

The term "electrochemically matched" refers to a set of cathode and anode EC films or materials with similar charge capacities and complementary oxidation states such that when joined together by a suitable ion-conducting and electrically insulating layer, a functional EC device is formed that shows reversible switching behavior over a substantial range of the theoretical charge capacities of the films or materials, respectively.

The terms "halide," "halogen" or "halo" as used herein alone or as part of another group refer to chlorine, bromine, fluorine, and iodine.

The term "inorganic electrochromic film" or "inorganic electrochromic material" as used herein describes comprise a film or material, respectively, comprising metals that undergo reversible oxidation and reduction reactions during the cycling of an electrochromic device. Inorganic electrochromic materials and films lack solubility in common organic and neutral aqueous solvents, and typically possess 3-dimensional framework structures where the metal ions are bridged to and share counter anions such as oxide, sulfide, nitride and halide, or complex molecular inorganic anions such as phosphate or sulfate. Inorganic electrochromic films comprising metal ions and carbon-containing counter anions in the 3-dimensional lattice are also known. These may be particle-based electrochromic materials. Examples include Prussian blue, Prussian blue analogs, nitroprusside compounds and other framework compounds comprising metal ions and cyanide anions or other anions similar to cyanide. These systems may also be referred to as organometallic electrochromic materials.

The term "transmissivity" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 400-730 nm using the spectral photopic efficiency I_p(lambda) (CIE, 1924) as a weighting factor.

The term "transparent" is used to denote substantial transmission of electromagnetic radiation through a material such that, for example, bodies situated beyond or behind the material can be distinctly seen or imaged using appropriate image sensing technology.

The "CIE-Lab" color space is used herein to describe the color of the substrate or device in the bleached or colored state. In this color space, $L^*$ indicates the lightness with the darkest black at $L^*=0$ and the brightest white at $L^*=100$, $a^*$ indicates the red/green component of color with green at negative $a^*$ and red at positive $a^*$ values, and $b^*$ indicates the yellow/blue component of color with blue at negative $b^*$ and yellow at positive $b^*$ values. The CIE-Lab color space is also referred to as the CIE $L^*a^*b^*$ color space, or the CIELAB color space, which is specified by the International Commission on Illumination (or in French, Commission Internationale de L'Eclairage) hence its CIE initialism). The scaling and limits of the $a^*$ and $b^*$axes will depend on the specific implementation of Lab color, as described below, but in this disclosure $a^*$ and $b^*$ vary over the range of ±100. The closer to zero (0) of the $a^*$ or $b^*$ values, then the more neutral the coloration.

The term "clear state" of an electrochromic device or panel refers to a state at, or very close to, the most transmissive state of the device of panel. In practice, the clear state of an electrochromic device or panel is achieved when the device or panel is switched towards the most transparent state, and the rate of change of the visible transmittance reaches a minimum. The term "dark state" of an electrochromic device or panel refers to a state at, or very close to, the least transmissive state of the device of panel. In practice, the dark state of an electrochromic device or panel is achieved when the device or panel is switched towards the least transparent state, and the rate of change of the visible transmittance reaches a minimum. The clear state and the dark state are described as the "bleached state" and the "colored state" respectively in the ASTM standard E2355-10: Standard Test Method for Measuring the Visible Light Transmission Uniformity of an Absorptive Electrochromic Coating on a Glazing Surface. Furthermore, in section 8.1 of ASTM E2355-10, there is a description for how to reach steady state in the clear state or the dark state before taking optical measurements (e.g., optical uniformity), which provides some guidelines for operating electrochromic modules. One such useful guideline is that steady state will be reached approximately 30 minutes after the change of state has been initiated, however, the document goes on to say that the time required to reach steady state "shall take into account variations in the dynamic response between samples from different manufacturers, of different technologies, and of different size." It should be noted that the particular values of visible transmission of the clear state and the dark state of an electrochromic device or panel can change over time.

The term "tinted state" (or "tint state") of an electrochromic device or panel refers to states with optical transmission between that of the clear state and dark state. In other words, the tint states are states with transmission between states at, or very close to, the most and least transmissive states of an electrochromic device or panel.

The term "color uniformity" refers to the spatially uniformity of the color of an electrochromic device or panel. An example of a measure of color uniformity is the metric delta E.

The term "delta E" (or "$\Delta E^*ab$", or "$\Delta E^*$", or "$\Delta E$", or "$dE^*$", or "dE") refers to a difference in color in the CIE $L^*a^*b^*$ color space, and is defined as:

$$\Delta E = \sqrt{(L_2^*-L_1^*)^2+(a_2^*-a_1^*)^2+(b_2^*-b_1^*)^2} \qquad (1)$$

The term "perceptible" as used herein with respect to color differences, refers to color differences which can be perceived by an average human eye. For example, in some regions of the CIE-Lab color space, the average human eye cannot perceive differences in color less than about delta E equal to 1. Similarly, the term "no perceptible color difference", refers to two colors that are close enough in color that they cannot be perceived as being different by an average human eye. The term "no perceptible color" as used herein refers to a color that is close enough in color to neutral (i.e., where $a^*=0$ and $b^*=0$) that the color cannot be perceived as being different than neutral by an average human eye. Quantifying sets of perceptually uniform colors is known to those skilled in the art as the set of points whose distance to the reference is less than the just-noticeable-difference (JND) threshold. In the CIE 1931 color space, for example, the tolerance contours of sets of perceptually uniform colors are bounded by MacAdam ellipses, which hold $L^*$ (lightness) fixed, and the ellipses denoting the tolerance contours vary in size. Furthermore, the sizes of the ellipses in the $a^*$ and $b^*$ plane that bound the sets of perceptually uniform colors can vary for different values of $L^*$.

The terms "switching speed" or "switching time" refers to the amount of time required for an electrochromic device or panel to transition from the dark state to a tinted state, or from the clear state to a tinted state, over a $T_{vis}$ range that is 90% of the full absolute percentage range from clear to dark. For example, if an electrochromic device has a clear state with a $T_{vis}$ of 71% and a dark state with a $T_{vis}$ of 1%, then 90% of the full absolute percentage range is 63%, and the switching speed would be the amount of time required for the device to switch from the clear state to a tinted state of 8%, or the amount of time required for the device to switch from the dark state to a tinted state with a $T_{vis}$ of 64%.

The term "tandem" refers to EC multilayer stacks or EC devices with two or more sub-stacks, where each of the sub-stacks contains one or more EC layers, an ion conductor layer, and one or more electrically conductive layers. In other words, a tandem EC multilayer stack is made up of two or more EC sub-stacks, each of which could in principle operate as a stand-alone EC multilayer stack (e.g., if separated from the tandem EC multilayer stack, and equipped with appropriate electrical connections, and in some cases appropriate electrically conductive layers). Note that electrical connections enabling one to individually address each device in the tandem device are not required. On the contrary, typically tandem EC devices will contain two main external electrical connections that switch all of the EC layers in the tandem EC multilayer stack with a single applied voltage (and/or an applied current). The term "monolithic tandem" refers to EC multilayer stacks or EC devices with two or more sub-stacks, where each of the sub-stacks contains one or more EC layers, and where the sub-stacks are integrated together into a single stack with no air gaps or significant spaces between the sub-stacks. An example of a tandem EC device that is not monolithic is an EC device constructed from two EC devices that are incorporated into an insulated glass unit (IGU) with a spacer between the EC devices that is filled with an inert gas.

DETAILED DESCRIPTION

Described herein are embodiments of tandem electrochromic (EC) panels, devices and multilayer stacks, which include two or more sub-stacks, where each of the sub-stacks contains one or more EC layers, an ion conductor layer, and one or more electrically conductive layers. Additionally, embodiments of EC panels, devices and multilayer stacks including free-standing ion conducting substrates (FICSs) are described. Embodiments of the current invention describe EC panels, EC devices and EC multilayer stacks, and methods of production of EC panels, EC devices and EC multilayer stacks, with low transmission in the dark state, high transmission in the clear state, desirable coloration in the dark and clear states, and spatially uniform switching, which can be readily manufactured on glass and flexible substrates.

There are a number of advantages of stacking 2 or more EC multilayer stacks in a tandem stack. For example, the transmission in the dark state can be reduced by stacking two or more EC multilayer stacks in tandem. Another advantage of tandem devices containing multiple EC layers is that each EC layer can be required to have a fraction of the charge capacity as would be needed for an EC device with only one anode and/or one cathode layer. EC layers in tandem devices, therefore, can be thinner than EC layers in conventional EC devices, be composed of different materials (e.g., materials with lower charge capacity), and/or be fabricated by different methods (e.g., methods creating films with lower charge capacity). Another advantage of monolithic tandem EC devices with two or more EC multilayer stacks integrated in series is that such devices will typically have lower operating currents and higher operating voltages (e.g., during device switching) than conventional EC devices with only one anode and/or cathode layer. The low operating current can be advantageous for a variety of reasons, including enabling the use of device wiring and associated electronics with low current carrying capabilities.

The invention includes multilayer stacks on rigid and flexible substrates that are complete and functional EC devices, or that can be used in the manufacture of complete and functional EC devices. In some embodiments, the multilayer stacks of the invention are produced on flexible substrates using roll-to-roll processing, and include stacks on one (mono-facial) or both sides of the flexible substrate (bifacial). In some embodiments, symmetric tandem multilayer stacks are preferred over asymmetric tandem stacks because they can be more easily manufactured in a roll-to-roll process. For example, a cathode-transparent conducting oxide (TCO)-substrate-TCO-anode is an asymmetric EC multilayer stack, while cathode-TCO-substrate-TCO-cathode is a symmetric EC multilayer stack and is preferred.

In some embodiments, novel mono-facial or bifacial EC multilayer stacks comprise one or more of the following: a) a gradient TCO; b) one or more transparent electron conductor (TEC) films that are conductors of electrons but not ions (e.g., Li+ or H+) and that separate 2 or more EC multilayer stacks (e.g., "anode-IC-cathode" EC multilayer stacks arranged in series, c) two or more anodic or two or more cathodic layers that are inorganic, d) inorganic anodes or cathodes that contain nanostructures (as described in U.S. Pat. No. 9,823,535 Tungsten Oxide Nanostructure Thin Films for EC Devices, incorporated herein by reference, and pending patent application Ser. No. 15/691,293 Electrochromic devices with nanostructure thin film anodes, also incorporated herein by reference).

In different embodiments, the bifacial and mono-facial EC multilayer stacks described herein can be used in different tandem configurations. In some embodiments, tandem EC multilayer stacks comprise a central transparent flexible bifacial substrate (e.g., TCO-polyethylene terephthalate (PET)-TCO, or silver nanowire (SNW)-PET-SNW) and 2 TCO-coated glass substrates. In some embodiments, the central transparent flexible bifacial substrate is coated on both sides with conductive films, and the 2 central conductive films and the 2 TCO layers function as the electrodes of the tandem EC device. In some embodiments, symmetric multilayer tandem stacks are used to produce a tandem EC device, and the multilayer tandem stacks include one or more of the following: a) a central transparent flexible bifacial cathode-coated central substrate (e.g., cathode-SNW-PET-SNW-cathode, or cathode-TCO-PET-TCO-cathode), b) a central transparent flexible bifacial IC-electrode-coated substrate (e.g., IC-cathode-SNW-PET-SNW-cathode, or IC-anode-SNW-PET-SNW-anode, or similar structures using TCO layers instead of SNW layers), c) a central transparent flexible substrate coated bifacially (i.e., on each side) with anode-IC-cathode-TCO (or SNW), or cathode-IC-anode-TCO (or SNW), and/or d) a central transparent flexible substrate coated bifacially (i.e., on each side) with TCO-anode-IC-cathode-TCO or TCO-cathode-IC-anode-TCO.

EC multilayer stacks with two or more sub-stacks, where each of the sub-stacks contains one or more EC layers, an ion conductor (IC) layer, and one or more electrically conductive layers, and where the sub-stacks are integrated together into a single stack with no air gaps or significant spaces between the sub-stacks (i.e., monolithic tandem EC multilayer stacks) are described herein. In some embodiments, the monolithic tandem EC multilayer stacks are incorporated into monolithic tandem EC devices. In some embodiments, monolithic tandem EC multilayer stacks include two or more EC multilayer stacks (i.e., sub-stacks) that can be integrated with a central transparent conductor ion blocking layer in between each EC multilayer sub-stack. The central transparent conductor ion blocking layer(s) include electrically conducting layers (ECLs) to which contact is made for applying voltage and/or current to each of the EC multilayer sub-stacks. The central transparent conductor ion blocking layer(s) also block ion diffusion or ion conduction to prevent leakage current between the EC multilayer sub-stacks. In some embodiments, the central transparent conductor ion blocking layer(s) contain multiple layers for electrical conduction and ion blocking. In some embodiments, the central transparent conductor ion blocking layer(s) contain a single material or composite material that performs the functions of electrical conduction and ion blocking. In some embodiments, monolithic tandem EC multilayer stacks also include gradient transparent electrically conductive layers with resistance to current flow substantially parallel to a major surface of the layers that varies as a function of position within the layers.

Methods for producing monolithic tandem EC multilayer stacks and devices are also described herein. In some embodiments, methods for producing monolithic tandem EC multilayer stacks include providing a central transparent conductor ion blocking layer, and arranging a first and second EC multilayer stack on either side of the central transparent conductor ion blocking layer. In some embodiments, methods for producing monolithic tandem EC multilayer stacks include providing a first EC multilayer stack, then arranging a central transparent conductor ion blocking layer on the surface of the first EC multilayer stack, and then arranging a second EC multilayer stack on the surface of the central transparent conductor ion blocking layer. In some embodiments, methods for producing monolithic tandem EC multilayer stacks include providing a first EC multilayer stack, providing a separate second EC multilayer stack, and then laminating the first and second EC multilayer stack together using the central transparent conductor ion blocking layer.

In some embodiments, single and tandem EC multilayer stacks and devices are produced using free-standing ion conducting substrates (FICSs). In some embodiments, FICSs are substrates with mobile alkali ions and ion conducting properties suitable for EC devices that have low water absorption. FICSs have mechanical properties that are sufficient for use as free-standing substrates, and are able to support the manufacturing of EC devices using a variety of methods. In some embodiments, FICSs are made from materials providing mobile alkali ions and an organic matrix. In some embodiments, the materials providing the mobile alkali ions in FICSs include alkali precursors and salts of an electrolyte anion that react at a certain temperature (e.g., greater than 80° C., or greater than 100° C., or greater than 120° C., or greater than 140° C., or from 80 to 150° C.) to produce mobile lithium ions. In some embodiments, the materials providing the mobile alkali ions in FICSs include particles of a solid state alkali IC and an alkali ion salt that is soluble in the organic matrix. Herein, FICS can also be referred to as ion conducting separator films (ICSFs).

Methods for producing single and tandem EC multilayer stacks and devices using free-standing ion conducting substrates (FICSs) are described herein. In some embodiments, a method for producing EC devices using free-standing ion conducting substrates (FICSs) includes providing a FICS with a first and second surface, arranging a first EC layer on a first surface of the FICS, arranging a first transparent conductor layer on the surface of the first EC layer, arranging a second EC layer on the second surface of the FICS, and arranging a second transparent conductive layer on the surface of the second transparent conductor layer. In some embodiments, a method for producing EC devices using free-standing ion conducting substrates (FICSs) includes providing a first EC layer, providing a second EC layer, and laminating the first and second EC layer together with a FICS. In some embodiments, a method for producing EC devices using free-standing ion conducting substrates (FICSs) includes depositing a first transparent conductive layer and a first EC layer on a first substrate, depositing a second transparent conductive layer and a second EC layer on a second substrate, cutting the first and second substrates (including the deposited layers) into sheets, and laminating the sheets together using a FICS.

In some embodiments, the monolithic tandem EC multilayer stacks and EC multilayer stacks including FICS can be incorporated into EC panels and/or EC devices. In some cases, the monolithic tandem EC devices and EC devices including FICS described herein have desirable optical properties. Some examples of desirable optical properties are uniform transitioning from one optical state to another across the entire device or panel (e.g., where all tinted states have a delta E less than 10 across the area of the panel), a clearer clear state with no perceptible color (e.g., where the clear state has an average CIE-Lab b* from 3 to 6, an average CIE-Lab a* from −4 to 2, and an average CIE-Lab L* from 85 to 90), and a more black colored dark state (e.g., where the dark state has an average CIE-Lab b* from −5 to −2, an average CIE-Lab a* from −7 to −5, and an average CIE-Lab L* from 10 to 30).

In one embodiment the monolithic tandem EC multilayer stacks and EC multilayers stacks including FICS can be incorporated into EC panels and/or EC devices with a low transmission dark state (e.g., with $T_{vis}$ less than 5%) and a high transparency clear state (e.g., with $T_{vis}$ greater than 70%), and a continuum of tinted states with varying transmission between these two end states. In some embodiments, the EC panel or device has a low transmission dark state (e.g., with $T_{vis}$ less than 5%) and a high transparency clear state (e.g., with $T_{vis}$ greater than 70%), and a continuum of tinted states with varying transmission between these two end states, and the dark state, the clear state and the tinted states all have colors that are close to neutral (e.g., with a* from −4 to 4, and b* from −6 to 6). This EC panel or device may also have fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The EC device or panels described herein may be used in many applications such as architectural applications or transportation vehicles. The architectural applications may include glass used on the exterior of the building such as windows or doors having insulated glass units (IGU's.) Other architectural applications include interior applications such as partitions, windows, or doors.

In one embodiment the EC device or panel can be used as privacy glass with a low transmission dark state (e.g., with $T_{vis}$ less than 0.1%) and a high transparency clear state (e.g., with $T_{vis}$ greater than 55%), and a continuum of tinted states with varying transmission between the clear and dark states.

In some embodiments, the EC device or panel has a low transmission dark state (e.g., with $T_{vis}$ less than 0.1%) and a high transparency clear state (e.g., with $T_{vis}$ greater than 55%), and a continuum of tinted states with varying transmission between the clear and dark states, and the dark state, the clear state and the tinted states all have colors that are close to neutral (e.g., with a* from −4 to 4, and b* from −6 to 6). The EC panel or device privacy glass may also have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The EC device or panel privacy glass may be used in many applications such as architectural or transportation. The architectural applications may include glass used on the exterior of the building such as windows or doors having insulated glass units (IGU's.) The architectural applications may also include interior applications such as partitions, windows, or doors.

EC Multilayer Stacks

FIG. 1 depicts a cross-sectional structural diagram of EC device 1 according to a first embodiment of the present disclosure. Moving outward from the center, EC device 1 comprises an IC layer 10. First electrode layer 20 is on one side of and in contact with a first surface of IC layer 10, and second electrode layer 21 is on the other side of and in contact with a second surface of IC layer 10. In addition, at least one of first and second electrode layers 20, 21 comprises EC material; in one embodiment, first and second electrode layers 20, 21 each comprise EC material. The central structure, that is, layers 20, 10, 21, is positioned between first and second electrically conductive layers 22 and 23 which, in turn, are arranged against "outer substrates" 24, 25. Any layered stack containing an electrochromic cathode or anode (e.g., layer 20 or 21 in FIG. 1) is referred to as an EC stack or an EC multilayer stack. In some embodiments, elements 20, 10, and 21, and optionally elements 22 and/or 23, are collectively referred to as an EC stack or an EC multilayer stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of the EC stack 28 may be changed by applying a voltage pulse to electrically conductive layers 22 and 23. The pulse causes electrons and ions to move between first and second electrode layers 20 and 21 and, as a result, EC material in the first and/or second electrode layer(s) change(s) optical states, thereby switching EC stack 28 from a more transmissive state to a less transmissive state, or from a less transmissive state to a more transmissive state. In one embodiment, EC stack 28 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by EC materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an EC device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific EC device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" may refer to an optically neutral state, e.g., uncolored, transparent or translucent. Still further, unless specified otherwise herein, the "color" of an EC transition is not limited to any particular wavelength or range of wavelengths. As understood by those of skill in the art, the choice of appropriate EC and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

In some embodiments, cathode materials for monolithic tandem EC devices and EC devices including FICSs include metal oxides including Ti, Zr, Hf, V, Nb, Ta, Cr, Mo, W, Sn, Sb and Bi and combinations thereof, that color under charge insertion (reduction). In some embodiments, cathodically coloring films include oxides based on tungsten, molybdenum, niobium, and/or titanium.

In some embodiments, anode materials for monolithic tandem EC devices and EC devices including FICSs include metal oxides including Ni, Fe, Mn, Co, and combinations thereof, that color upon charge extraction (oxidation). A variety of anodically coloring films including Ni, Ir, and Fe are known in the art and can be prepared by a number of deposition processes including vapor deposition processes, wet-coating processes, spray coating processes, dip coating, and electrodeposition. Many of these anodic films are mixed metal oxides where lithium or protons are intercalated to balance charge during cycling. Additionally, non-oxide based films such as Prussian blue materials can be useful as anodic electrochromic films. In one embodiment, anodically coloring films include oxides and based on nickel, iridium, iron, chromium, cobalt and/or rhodium.

Additionally, in some embodiments cathodes for monolithic tandem EC devices and EC devices including FICSs can include crystalline metal oxide nanostructures including Ti, Zr, Hf, V, Nb, Ta, Cr, Mo, W, Sn, Sb and Bi and combinations thereof.

In some embodiments, a monolithic tandem EC device with a central transparent conductor ion blocking layer is fabricated using particle-based anode and cathode electrochromic layers. In some embodiments, the particle-based cathodes for monolithic tandem EC are nanostructure tungsten trioxide cathodes. In some cases, the cathodes in these devices are deposited from dispersions containing crystalline tungsten trioxide nanostructures. The tungsten trioxide materials can have the formula $A_yW_{1-x}M_xO_{3\pm z}$ ($kH_2O$), where A is situated within the hexagonal or hexagonal-like channels of the crystal structure, and where M is substituted within the W-O lattice. As such, A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. As such, x is from about 0 to about 1, y is from about 0 to about 0.5, and where z can be from about −0.5 to about 0.5. A and/or M also comprise more than one element and be expressed as $A'_a+A''_b+A'''_c$ and/or $M'_d+M''_e+M'''_f$ where A', A'' and A''' and/or M', M'' and M''' are different elements, where a+b+c=y and d+e+f=x. The crystal structure may be monoclinic perovskite, tetragonal perovskite, hexagonal, pyrochlore (i.e., tetrahedral clusters of corner sharing $WO_6$ octahedra), or have hexagonal-like channels.

More details on cathodic nanostructured electrochromic materials and different embodiments applicable to the EC devices described in this specification can be found in U.S. Pat. No. 9,823,535 entitled Tungsten Oxide Nanostructure Thin Films for EC Devices (incorporated herein by reference).

Additionally, in some embodiments anodes for monolithic tandem EC devices and EC devices including FICSs can include alkali metal oxide nanostructures including Ni, Fe, Mn, Co, and combinations thereof.

In some embodiments, the particle-based anodes for monolithic tandem EC devices are nanostructure lithium nickel oxide anodes. In some cases, the anodes in these devices are deposited from dispersions containing crystalline lithium nickel oxide nanostructures. The crystalline lithium nickel oxide films can contain other metals including Sb, Nb, Ti, Mo, Zn, Al, Te, or combinations thereof. For example, some of the lithium nickel oxide films in these devices are $LiNi_{1-x}M_xO_2$ (M=Al, Co, Mn), $Li_2Ni(WO_4)_2$, $Na_4M_3(PO_4)_2(P_2O_7)$ (M=Mn, Fe, Co, Ni), $Na_7M_4(PO_4)(P_2O_7)_4$, $Na_7M_3(P_2O_7)_3$, $NaK_5Ni_5(P_2O_7)_4$, $Li_{0.9}Ni_{0.45}Ti_{0.55}O_2$, $Li_{1+x/100}Ni_{1/2-x/120}Ti_{1/2-x/120}Mo_{x/150}O_2$ (x=50, 20), $Na_3Ni_2MO_6$ (M=Ta, Sb), $LiFePO_4$, doped $LiFePO_4$, NASICON and LISICON materials, for example $Li_2M_2(M'O_4)_3$ (M=Ni, Fe; M'=Mo, W) and others, $Li_3Ni_{2-x}M'_xMO_6$ (M=Nb, Ta, Sb; M'=Zn, Al, Ti), $A_2M_2TeO_6$ (A=alkali; M=Ni, Co, Mg, Mn, Zn), layered lithium nickel oxides, ordered or disordered rock salt structures or excess Li-containing materials such as $Li_xNi_{(2-(4x/3))}Sb_{(x/3)}O_2$. These films have different crystal structures including disordered rock salt, ordered rock salt, hexagonal layered $AMO_2$ (for example A=alkali, M=Ni but many other combinations are known), layering polytypes of $AMO_2$ (e.g., $A_3(M_2M')O_6$ with M-M' ordering, and O3, P2 and P3 polytypes), spinel, olivine (e.g., conventional $LiFePO_4$), NASICON, LISICON, alluaudite (related to $LiFePO_4$), or many polyphosphates.

More details on anodic nanostructured electrochromic materials and different embodiments applicable to the EC devices described in this specification can be found in patent application Ser. No. 15/691,293 entitled Electrochromic devices with nanostructure thin film anodes (incorporated herein by reference).

In other embodiments, the particle-based anodes or cathodes for monolithic tandem EC devices are particle-based inorganic anode or cathode films comprising metallocyanide framework compounds such as Prussian Blue and Prussian Blue derivatives.

In some embodiments, the EC layers for monolithic tandem EC devices are mixtures of anodic and cathodic nanostructures. For example, the cathodic nanostructures in mixed EC layers in these devices can be nanostructure tungsten trioxide cathodes, deposited from dispersions containing crystalline tungsten trioxide nanostructures with hexagonal or pyrochlore crystal structures, and the anodic nanostructures can be nanostructure lithium nickel oxide anodes, deposited from dispersions containing crystalline lithium nickel oxide nanostructures. In some embodiments, the lithium nickel oxide nanostructures in the above example are $Li_3Ni_{2-x}M'_xMO_6$ (M=Nb, Ta, Sb; M'=Zn, Al, Ti) or $Li_xNi_{(2-(4x/3))}Sb_{(x/3)}O_2$.

IC layer 10 serves as a medium through which ions are transported (in the manner of an electrolyte) when the electrochromic device switches between an optically less transmissive ("colored") state and an optically more transmissive ("bleached") state. Stated differently, the ion conducting layer permits sufficient ionic conduction between the first and second electrode layers 20, 21 upon the application of a voltage across electrochromic stack 28. Depending on the choice of materials, such ions include lithium ions (Li+) and hydrogen ions (H+) (i.e., protons). Other ions may also be employed in certain embodiments. These include deuterium ions (D+), sodium ions (Na+), potassium ions (K+), rubidium ions (Rb+), cesium ions (Cs+), ammonium ions (NH4+), calcium ions (Ca++), barium ions (Ba++), strontium ions (Sr++), magnesium ions (Mg++) or others. In one embodiment, IC layer 10 has a lithium ion conductivity of at least about $10^{-4}$ S/cm at room temperature (i.e., 25° C.). By way of further example, in one such embodiment IC layer 10 has a lithium ion conductivity of at least about $10^{-3}$ S/cm at room temperature. By way of further example, in one such embodiment IC layer 10 has a lithium ion conductivity of at least about $10^{-2}$ S/cm at room temperature. Preferably, IC layer 10 has sufficiently low electron conductivity that negligible electron transfer takes place between the anode and the cathode during normal operation.

Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSI (lithium bis(trifluoromethane) sulfonimide), $LiBF_4$ (lithium tetrafluoroborate), $LiPF_6$ (lithium hexafluorophosphate), $LiAsF_6$ (lithium hexafluoro arsenate), $LiCF_3SO_3$ (lithium trifluoromethane sulfonate), $LiB(C_6F_5)_4$ (lithium perfluorotetraphenylboron) and $LiClO_4$ (lithium perchlorate). Additional examples of suitable IC layers include silicates, tungsten oxides, tantalum oxides, niobium oxides, and borates. The silicon oxides include silicon-aluminumoxide. These materials may be doped with different dopants, including lithium. Lithium-doped silicon oxides include lithium silicon-aluminum-oxide. In some embodiments, the IC layer comprises a silicate-based structure. In other embodiments, suitable ICs particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the IC layer 10 will vary depending on the material. In some embodiments using an inorganic IC the IC layer 10 is about 250 nm to 1 nm thick, preferably about 50 nm to 5 nm thick. In some embodiments using an organic IC, the IC layer is about 1000000 nm to 1000 nm thick or about 250000 nm to 10000 nm thick.

In one embodiment, the ion-conducting layer is produced from a liquid formulation that comprises an electrolyte solvent or plasticizer, a polymerizable monomer or set of monomers, an optional polymerization initiator, and a salt such as a lithium salt or an acid. The formulation may also comprise other additives to promote device performance such as pH buffers, UV stabilizers, and the like.

In one embodiment, the ion-conducting film is produced from the ion conducting formulation by depositing the liquid formulation with the anode film, cathode film, or both films in a sufficient quantity to form a continuous pre-crosslinked film having a uniform thickness between 50 and 500 microns between the anode and cathode plates. This assembly may then be placed in a vacuum laminator and heated under vacuum to form a sealed assembly. Polymerization of the monomer/co-monomer may be initiated either thermally or photochemically. In one embodiment, any thermal processing of the device, particularly one where plastic is the substrate, is below the temperature of 300° C., or below 200° C., or below 15 0° C., or below 100° C., or from 150° C. to 300° C.

Alternatively, free-standing fully formulated ion-conducting films may be used in place of the crosslinking IC formulation or the liquid IC formulation. Free-standing IC films may be used in a "cast in place" process where a pre-formed cavity between the anode and cathode is produced (edge sealed) and the formulation is forced into this cavity through fill ports. Additional embodiments of free-standing IC films (i.e., substrates) are discussed below.

Typical monomers used in these formulations are polar organic olefins such as acrylates, or other well-known polymerization systems such as silicones, urethanes and the like.

More details on IC layers and different embodiments applicable to the EC devices described in this specification can be found in U.S. Pat. No. 9,720,299 entitled Electrochromic multi-layer devices with cross-linked ion conducting polymer (incorporated herein by reference).

Gradient TCOs for EC Devices

Figure 2:
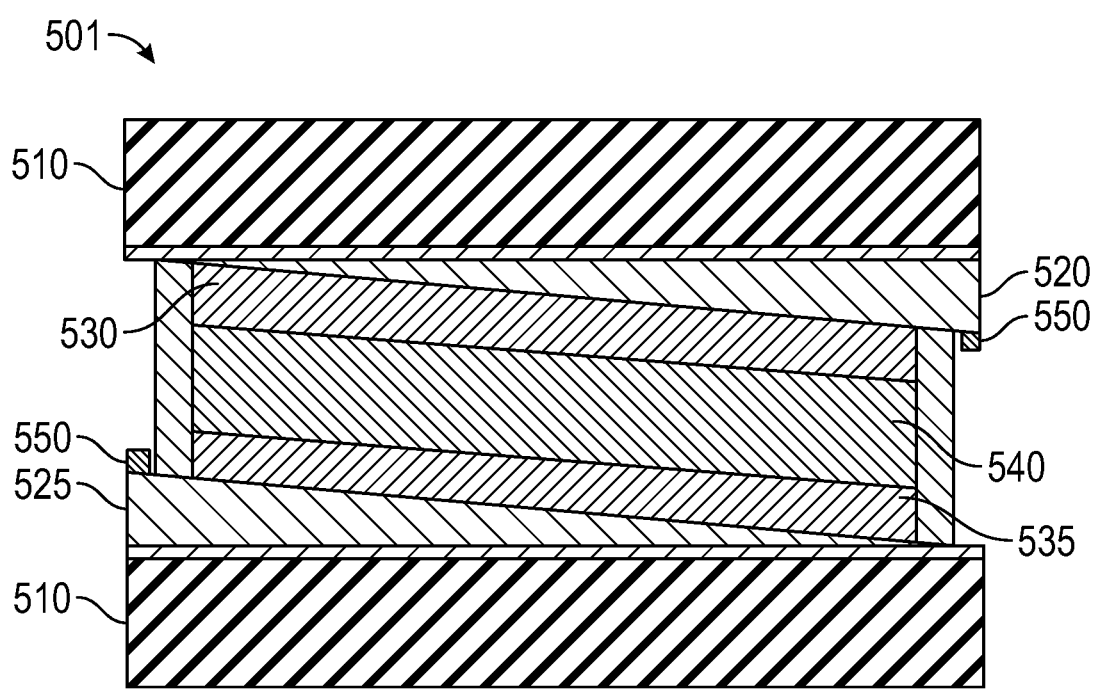
FIG. 2 depicts a cross-sectional structural diagram of electrochromic (EC) device with gradient ECLs.

FIG. 2 illustrates an EC panel 501, in some embodiments, viewed in cross-section. The panel is a "sandwich" of the EC device materials between two substrates 510. The substrates may be either glass or plastic or any other transparent material. Each of the substrates 510 has electrically conducting layers (ECLs) 520 and 525. In some embodiments, the ECLs are formed of a transparent conductive layer, such as a transparent conductive oxide (common materials include indium tin oxide and tantalum tin oxide), though they may be any material meeting the requirements of being transparent and electrically conductive. In some embodiments, one or both of the ECLs are gradient ECLs. An electrically conductive layer with a "gradient", as defined herein, refers to an ECL with spatially varying sheet resistance, or resistance to current flow substantially parallel to a major surface of the layer that varies as a function of position within the electrically conductive layer. Other embodiments include, a "gradient ECL", or a "gradient TCO", or a "gradient transparent conducting layer", all of which are ECLs with gradients as defined above. In the embodiments depicted in 501 the ECLs are a gradient based on thickness of the transparent conductive oxide (TCO) material and have an inverse symmetry. The ECL 520 is thinnest on the left side and becomes thicker as it moves towards the right side. The ECL 525 has the inverse symmetry and is thicker on the left side and becomes thinner as it moves towards the right side.

Figure 3:
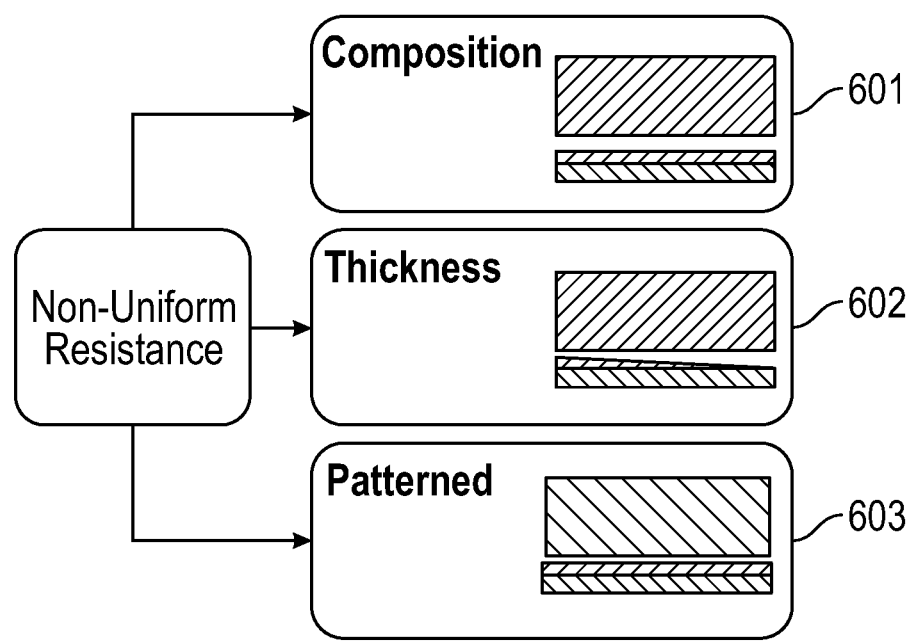
FIG. 3 depicts resistance gradients formed in transparent conductive layers by different techniques.

In other embodiments, as illustrated in FIG. 3, the resistance gradient in the transparent conductive layer may be formed by different techniques such as by creating a gradient in the composition of the transparent conductive layer as shown in 601 or by patterning the materials with a scribe or etchant as shown in 603 to effectively create an "electron maze." Regardless of the technique used, the gradients may have an inverse symmetry to one another. The gradient transparent conductive layer allows for the use of EC devices in panels used for large scale applications such as architectural windows or in transportation applications such as buses and trains or automobiles. This is because gradient transparent conductive layer(s) enable a more uniform drop in effective voltage across the EC panel 501. In other words, the voltage drop across the device (e.g., the voltage drop between the cathode and the anode) in a region near one of the bus bars is equal to, or similar to, the voltage drop across the device at a point near the center of the active area of the device. This is in contrast to conventional devices without gradient ECLs, where the voltage drop across the device will vary significantly from point to point within the device. Therefore, EC devices with one or more gradient ECLs have more uniform transitions between tint states across all dimensions of the device, than conventional EC devices without gradient ECLs. More details on gradient transparent conductive layers and different embodiments applicable to the EC devices described in this specification can be found in U.S. Pat. No. 8,717,658 entitled EC Multi-Layer Devices With Spatially Coordinated Switching (incorporated herein by reference), U.S. Pat. No. 9,091,895 EC Multi-Layer Devices With Composite Electrically Conductive Layers (incorporated herein by reference), U.S. Pat. No. 9,091,868 EC Multi-Layer Devices With Composite Current Modulating Structure (incorporated herein by reference), and patent application number U.S. Pat. No. 9,507,233 EC Multi-Layer Devices With Current Modulating Structure (incorporated herein by reference.) The gradient transparent conductive layers 520 and 525 not only remove the "iris effect" problem that larger scale EC devices have by enabling the uniform transition between states across the entire surface of the EC panel, but enables the fast transition between tint states (i.e., a short switching time, or a fast switching speed) and in particular from the clear state to the dark state and vice versa.

FIG. 2 depicts an EC device with a single EC multilayer stack and gradient electrically conductive layers (ECLs) on both electrodes. In other embodiments described herein, gradient ECLs can be utilized in monolithic tandem EC multilayer stacks with two or more EC multilayer stacks. In tandem EC multilayer stack embodiments, gradient ECLs can be used on both electrodes in each EC multilayer stack making up the monolithic tandem EC multilayer stacks, or on one ECL in each of the EC multilayer stack making up the monolithic tandem EC multilayer stacks. Additional embodiments of tandem EC devices with gradient ECLs are described below.

Transparent Electrically Conductive Layers on Flexible Substrates

A variety of materials and manufacturing techniques are herein disclosed for making transparent electrically conductive layers, including but not limited to transparent conducting oxides, for EC devices on various substrates, including flexible substrates. In some cases, these materials and manufacturing techniques are suitable for use on large or small areas of glass substrates, and in some cases are suitable for use on large or small areas of flexible substrates. Some examples of flexible substrates are plastic substrates made from materials such as polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers.

Transparent conductive layers with uniform horizontal sheet resistance and uniform vertical resistance are known for use in EC devices. The sheet resistance ($R_s$) of a layer is defined as the bulk resistivity ($\rho$) divided by the thickness (t) of the layer. In other words, $R_s=\rho/t$, and layers with higher bulk resistivity, and/or that are thinner, will generally have higher sheet resistances. However, many of the materials typically used for glass substrates require high processing temperatures to reduce the sheet resistance and improve the transmission. For example, transparent conductive oxides (TCOs) are commonly used as electrically conductive layers for EC devices. TCOs are typically deposited on glass by sputtering, with substrate temperatures greater than the maximum tolerable temperatures of most flexible substrates (e.g., greater than 300° C.). TCOs that are deposited on flexible substrates with lower than optimal deposition temperatures, typically have inferior sheet resistance and/or transmission compared to TCOs on glass, which leads to exacerbated iris effects. Some examples of TCO materials are indium tin oxide (ITO), fluorine-doped tin oxide (FTO), and aluminum-doped zinc oxide (AZO). In some cases, bilayers of oxides can also be used including a barrier layer next to the substrate and a TCO deposited on top of the barrier layer. Some examples of barrier layer materials are silica ($SiO_x$), and tin oxide ($SnO_x$).

EC devices on flexible substrates can employ other transparent conductive materials that are deposited at lower temperatures and still achieve low sheet resistance and high transmission. Some examples of low temperature low sheet resistance transparent conductive materials are wire meshes (e.g., copper wire meshes), nanowire meshes (e.g., silver nanowire meshes), carbon nanotube meshes, particulate coatings (e.g., TCO particles), and nanoparticulate coatings (e.g., nanographite coatings and graphene coatings). In some cases, the low temperature low sheet resistance transparent conductive materials are composite materials with wire meshes, nanowire meshes, carbon nanotube meshes, particulate coatings, and/or nanoparticulate coatings dispersed in a matrix or binder. In some embodiments, the matrix or binder is a conductive organic material, an insulating organic material, a cross-linked polymer, or an insulating inorganic material.

In some cases, the low temperature low sheet resistance transparent conductive material can be deposited by solution deposition techniques. Some solution deposition techniques include slot die coating and spray coating, however many solution deposition techniques could be suitable. In some cases the low temperature low sheet resistance transparent conductive material can be deposited with a binder (e.g., a polymeric material), which serves to provide mechanical stability and/or adhesion to the layer. In some cases the low temperature low sheet resistance transparent conductive material can be deposited without a binder.

In some cases, EC devices on flexible substrates can employ composite transparent conductive layers. For instance a thin layer of a TCO can be deposited at low temperature, and a low temperature low sheet resistance transparent conductive material can be deposited on top of the TCO. Some examples of such composite layered structures are a thin layer (e.g., 10 to 100 nm) of indium tin oxide deposited at temperatures tolerable by the flexible substrate, and a silver nanowire mesh solution deposited on top.

Processing flexible plastic substrates is limited by the melting point (or glass transition temperature, or softening point) of the substrate, which is typically lower than the melting temperature (or glass transition temperature, or softening point) of glass. Also, the requirement for flexibility may lead to thinner materials to avoid cracking of the material during flexure. These low temperature and/or thinner materials typically have higher sheet resistance than electrically conductive layers on glass substrates. For these reasons, prior attempts at producing EC devices on flexible substrates have often been limited to smaller area devices, and attempts at larger area devices have shown exaggerated bull's-eye effect (i.e., iris effect). Some embodiments of the present disclosure are on large area flexible substrates, such as a web used in roll to roll processing, and can be cut to various sizes. These embodiments have less iris effect compared to typical large area EC devices on flexible substrates as a result of the reduced sheet resistance offered by the low temperature low sheet resistance transparent conductive materials described herein, in one or more transparent conductive layers.

Additionally, the iris effect can be mitigated by varying the vertical resistance and/or horizontal sheet resistance according to horizontal location in transparent conductive layers (e.g., using gradient transparent conducting layers). Materials and manufacturing techniques can be used to control vertical resistance and/or horizontal sheet resistance that varies according to horizontal location in transparent conductive layers. The profiles of vertical resistance and/or horizontal sheet resistance of transparent conductive layers on glass and flexible substrates can be tuned to decrease or eliminate the iris effect, which result in a more uniform change in transmissivity across even large structures as compared to EC devices made with uniform transparent conductive layers. In various embodiments, these profiles have ratios (i.e., between maximum and minimum) in vertical resistance and/or horizontal sheet resistance equal to two to one, ten to one, one hundred to one, or other ratios between these ranges or outside of these ranges, as specific to tuning. It should be appreciated that a transparent conductive layer can be a compound layer having multiple layers and/or multiple materials.

More details on gradient transparent conductive layers and different embodiments applicable to the EC devices described in this specification can be found in U.S. Pat. No. 9,658,508 entitled Manufacturing methods for a transparent conductive oxide on a flexible substrate (incorporated herein by reference).

Methods for Producing Ec Multilayer Stacks

Particle-Based Cathodic EC Film Production Methods

In some cases, especially those where the processing temperature of the EC multilayer stacks are limited, cathodic and anodic EC films can be deposited using methods including forming EC particles or nanostructures, and subsequently depositing the EC particles or nanostructures onto a substrate or multilayer stack to form an EC film. One advantage of using particle-based EC film synthesis is that high temperatures can be used for the production of the EC particle materials, and then the particulate materials can be deposited as a film using low temperature processes. This is particularly advantageous when depositing EC films onto substrates or multilayer stacks with limited processing temperatures. A benefit of this type of a process is that high quality electrochromic films can be deposited on substrates that have relatively low melting points relative to the temperatures required to form the electrochromic materials, or on multilayer stacks with limited degradation temperatures. Some examples of the desirable properties of high quality electrochromic films are desirable optical properties (e.g., high optical transmission and b* near zero), desirable electrical properties (e.g., high capacity), and desirable durability (e.g., low fade).

In some cases, EC materials with high quality are crystalline. In some cases the crystalline EC materials have crystal structures that require high temperature formation, which is greater than the melting point of the EC multilayer stack substrate (e.g., glass or plastic). Such crystalline materials cannot be grown directly on the substrates due to the limited processing temperatures. However, EC films can be produced using methods including forming EC particles of nanostructures using high processing temperatures, and subsequently depositing the EC particles or nanostructures onto a substrate or multilayer stack to form an EC film. These methods for producing a crystalline thin film, can be used in EC multilayer stacks with substrates that are stable under high temperature conditions, for example glass or quartz, or where the substrate is unstable under high temperature conditions, for example plastics (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

In some embodiments, cathodic or anodic crystalline EC materials are produced via conventional solid state reactions comprising repetitive heating and grinding cycles, hydrothermal synthesis, sol-gel synthesis methods where reactive species are hydrolyzed to form colloids, inert atmosphere reactions, flux reactions, nanosynthesis reactions, microwave synthesis reactions, laser pyrolysis reactions, spray drying, or the like. In some embodiments, different characteristics of the previously listed synthesis methods are combined in a step-by-step manner. In some embodiments, variable heat treatment steps are required while in others, only a single heat treatment step is necessary. Heat treatment may comprise precursor decomposition, calcination, sintering and even melting. In some embodiments, the temperature range of the thermal treatment is below 300° C., or below 200° C., or below 150° C., or below 100° C., or from 150° C. to 300° C., while in others it may be greater than 300° C.

In some embodiments, methods for producing a monolithic tandem EC multilayer stack include methods of producing metal oxide nanostructures or particles, which are deposited as thin films with cathodic electrochromic properties. In some embodiments, these particles are prepared using hydrothermal synthesis. In some embodiments, these films are also incorporated into multi-layer stacks, and electrochromic devices. In some embodiments these cathodic EC particles for monolithic tandem EC devices and free-standing ICs for EC devices can include crystalline metal oxide nanostructures including Ti, Zr, Hf, V, Nb, Ta, Cr, Mo, W, Sn, Sb and Bi and combinations thereof. In some cases these particles are tungsten trioxide, hexagonal tungsten trioxide, or pyrochlore tungsten trioxide particles.

In an embodiment, the crystalline particles used in the cathodic EC crystalline thin film may comprise a transition metal oxide or a main group metal oxide The cathodic EC crystalline thin film may also be formed of a mixed metal oxide comprising alkali metals, alkaline earth metals, transition metals, main group metals and lanthanide metals or a mixed metal oxide comprising metals and non-metals where the non-metals may be part of a complex anion such as phosphate, sulfate, selenate, tellurate, silicate, germanate or carbonate. The method to produce the cathodic EC crystalline metal oxide thin film may include the synthesizing of the crystalline EC metal oxide particles, the size-reducing of those particles (e.g., by grinding, or the like), the formulating of the size-reduced particles into an ink, and coating the ink on a substrate to produce a crystalline electrochromic metal oxide thin film.

In some cases, the crystal structure of the cathodic EC materials is important. In some embodiments, monolithic tandem EC multilayer stacks are produced using methods to produce a crystalline thin film, wherein crystalline particles are synthesized, size-reduced by grinding, formulated into an ink, and coated on a substrate to produce a crystalline thin film. The crystalline thin film may be an electrochromic thin film where formed of an electrochromically active metal oxide.

Particle-Based Anodic EC Film Production Methods

Many of the same motivations and methods for producing cathodic EC films described above also apply to anodic EC films.

In some embodiments, methods for producing EC multilayer stacks include methods of producing mixed metal oxide nanostructures or particles which are deposited as thin films with anodic electrochromic properties. In some embodiments, the mixed metal oxide nanostructures or particles include lithium nickel oxide, alkali nickel metal oxide, alkali transition metal tellurate, or alkali transition metal phosphate electrochromic materials produced using methods that are amenable to high volume, low cost manufacturing. The term "mixed metal oxide" refers to a metal and oxygen containing material in which at least two metals are present (e.g., M1 and M2). The term "alkali nickel metal oxide" refers to a material that contains an alkali metal (such as Li or Na), Ni, and O and also contains another metal such as Zn, Y, Ti, Zr, Hf, V, Nb, Ta, Mo, W, B, Al, Ga, In, Si, Ge, Sn, P, Sb and combinations thereof either as dopants, for example in stoichiometric quantities that are 1-10%, or as primary components in which they may be present in stoichiometric quantities that are approximately equal to the alkali or Ni. Additionally, in some embodiments the mixed metal oxide nanostructures or particles can include alkali metal oxide nanostructures or particles including Ni, Fe, W, Zn, Y, Ti, Zr, Hf, V, Nb, Ta, Mo, B, Al, Ga, In, Si, Ge, Sn, P, Sb, Te, Mn, Co, and combinations thereof.

Additionally, methods for producing a EC multilayer stacks include methods of producing mixed metal oxide nanostructure-based or particle-based films having robust mechanical properties, and having deposition methods that are compatible with substrates requiring low maximum processing temperatures. In some embodiments, methods to produce a nanostructure thin film include synthesizing mixed metal oxide particles, size-reducing the particles by grinding, formulating the particles into an ink, and coating the particles onto a substrate to produce a thin film. The term "nanostructure" or "nanostructures" as used herein refers to nanowires, nanoparticles, nanofoams, nanoporous films, or any structure with dimensions between microscopic and molecular scale structures. The term "grinding" as used herein refers to size-reduction of particles by mechanical means. The term "ink" as used herein refers to a mixture containing a liquid and suspended particles that is used for coating a film. The mixed metal oxide particles synthesized may be crystalline, partially crystalline, or amorphous. In some embodiments, the resulting thin film may be crystalline, partially crystalline or amorphous. The thin film may be an anodic electrochromic thin film when formed of an electrochromically active metal oxide.

The method for producing EC multilayer stacks including methods of producing mixed metal oxide nanostructure-based or particle-based films provides a low temperature process for the formation of a film on a substrate or multilayer stack by preparing the deposited material in an earlier higher temperature process. In some embodiments, the method of making the particles includes both preparing the particles using a thermal treatment, and then grinding the particles using a process such as milling to form nanostructures of the particles. The term "thermal treatment" refers to calcination, annealing, sintering, hydrothermal methods and many others known in the art. The nanostructures may then be dispersed into an ink and deposited onto a substrate to form a thin film. In some embodiments, these films are also incorporated into EC multilayer stacks. The methods described herein enable high temperature processing (e.g., that is required to create crystalline electrochromic material) to be performed before the electrochromic material is deposited on the substrate, which then enables electrochromic materials requiring high temperature processing to be deposited on a substrate in a low temperature process.

Gradient Transparent Conducting Film Production Methods

In some embodiments, methods for producing a monolithic tandem EC multilayer stack include methods of producing electrically conductive layers having a non-uniform sheet resistance. In one embodiment, the non-uniform sheet resistance is the result of a composition variation in the layer. Some examples of methods for forming these composition variations are sputter coating from two cylindrical targets of different materials while varying the power to each target as a function of position relative to the substrate, reactive sputter coating from a cylindrical target while varying the gas partial pressure and/or composition as a function of position relative to the substrate, spray coating with a varying composition or process as a function of position relative to the substrate, and introducing a dopant variation to a uniform composition and thickness film by ion implantation, diffusion, or reaction. In another embodiment, the non-uniform sheet resistance is the result of a thickness variation in the layer. Some examples of methods for forming these thickness variations are sputter coating from a cylindrical target while varying the power to the target as a function of as a function of position relative to the substrate, sputter coating from a target at constant power and varying the velocity of substrate under the target as a function of as a function of position relative to the substrate, and depositing a stack of uniform TCO films on substrate where each film has a limited spatial extent. Alternatively, a thickness gradient can be formed by starting with a uniform thickness conductive layer and then etching the layer in a way that is spatially non-uniform such as dip-etching or spraying with etchant at a non-uniform rate across the layer. In another embodiment, the non-uniform sheet resistance is the result of patterning. An example of a method for forming gradients is laser patterning a series of scribes into a constant thickness and constant resistivity film to create a desired spatially varying resistivity. In addition to laser patterning, mechanical scribing and lithographic patterning using photoresists (as known in the art of semiconductor device manufacturing) can be used to create a desired spatially varying resistivity. In another embodiment, the non-uniform sheet resistance is the result of a defect variation. Some examples of methods for introducing a defect variation are introducing spatially varying defects via ion implantation, and creating a spatially varying defect density via a spatially varying annealing process applied to a layer with a previously uniform defect density.

Gradient transparent conducting layers can also be fabricated on flexible substrates. In some embodiments, gradient transparent conducting layers can be produced on flexible substrates using roll to roll processing, which can be economical for large volume production. Roll to roll processing is especially well suited to manufacturing layers and devices on flexible substrates. In some embodiments, the web is controlled, and materials are deposited on a substrate in varied concentrations and thicknesses, giving rise to the desired characteristics of the materials and layers. In some embodiments, the vertical resistance and horizontal sheet resistance, or horizontal resistance, of a material can be varied in the long or short direction along a web.

Monolithic Tandem Ec Multilayer Stacks

Figure 4:
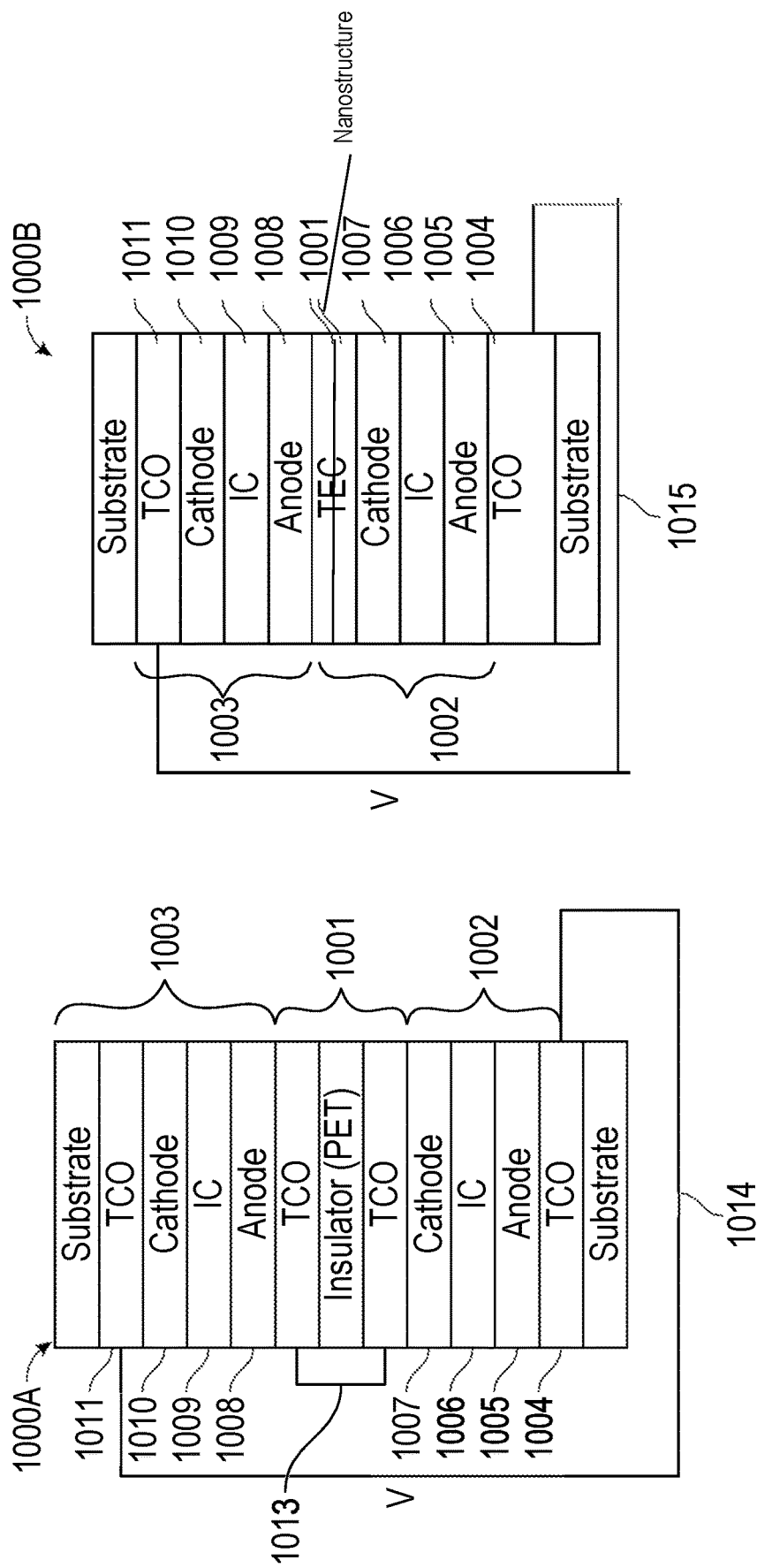
FIG. 4 shows two embodiments of monolithic tandem EC multilayer stacks, each of which contain a central transparent conductor ion blocking layer, a first EC multilayer stack, and a second EC multilayer stack.

FIG. 4 shows two embodiments of monolithic tandem EC multilayer stacks (1000A and 1000B), each of which contain a central transparent conductor ion blocking layer (1001), a first EC multilayer stack (1002), and a second EC multilayer stack (1003). FIG. 4 shows that the first EC multilayer stack (1002) can be arranged on a first surface of the central transparent conductor ion blocking layer (1001), and the second EC multilayer stack (1003) can be arranged on a second surface of the central transparent conductor ion blocking layer (1001). In some embodiments, the monolithic tandem EC multilayer stacks (1000A and 1000B) are incorporated into monolithic tandem EC multilayer devices. The first and second EC multilayer stacks (1002 and 1003) can also be referred to as EC sub-stacks comprising the EC multilayer stacks 1000A and 1000B. EC multilayer stacks (or sub-stacks) include one or more EC layers. Additionally, in different embodiments, EC multilayer stacks (or sub-stacks) can optionally include one or more IC layers, one or more transparent electrically conductive layers, one or more central transparent conductor ion blocking layers, and/or one or more substrates.

The first and second EC multilayer stacks (or sub-stacks) can contain an anodic EC layer, a cathodic EC layer, and an IC layer in between the EC layers. In some embodiments, the first and second EC multilayer stacks each contain a single EC layer, a counter electrode, and an IC layer in between the EC layer and the counter electrode. Therefore, in some embodiments, each EC multilayer stack (or sub-stack) is capable of transitioning between a clear state and a dark state. The EC sub-stacks can also optionally include one or more electrically conductive layers (e.g., 1004 or 1011 in FIG. 4). In some embodiments, each EC multilayer sub-stack is capable of transitioning between a plurality of tinted states between the clear state and the dark state.

In one embodiment, a monolithic tandem EC multilayer stack contains a central transparent conductor ion blocking layer (1001) that contains a flexible transparent film coated with central transparent conductor layers on both sides. An example of such a monolithic tandem EC multilayer stack is shown in 1000A in FIG. 4. Some examples of transparent conductor layers are described above, including layers that can be processed at low temperatures that are compatible with flexible substrates (e.g., plastic substrates) and/or organic functional layers. In some embodiments, a central transparent conductor ion blocking layer (1001) contains a flexible transparent film coated with central transparent conductor layers and corrosion resistant layers on both sides. For example, the flexible transparent film can be made from plastic (e.g., PET), the central transparent conductor layers can be a thin film (e.g., a TCO such as indium tin oxide (ITO), or a thin metal such as Ag or Au), and the corrosion resistant layers can be a thin film that protects the central transparent conductor layers (e.g., an oxide film such as indium oxide, tin oxide, or zinc oxide).

In a second embodiment, a monolithic tandem EC multilayer stack contains a central transparent conductor ion blocking layer (1001) that has a single layer, or a single composite layer, providing sufficient electrical conductivity and ion blocking properties. An example of such a monolithic tandem EC multilayer stack is shown in 1000B in FIG. 4. In some embodiments, the central transparent conductor ion blocking layer material is selected from the group consisting of conductive nanowires embedded in a polymer (e.g., PET), and conductive nanoparticles embedded in a polymer (e.g., PET). In other embodiments, ion blocking layer 1001 is an inorganic material or an inorganic composite material (e.g., doped or undoped tin oxide, tin oxides doped with indium or tantalum).

In some embodiments, the central transparent conductor ion blocking layer (1001) has thickness and ionic mobility such that the device will maintain a specific optical/electrochemical state without power (i.e., at open circuit voltage) for more than a minute, or more than an hour, or more than a day, or more than a week, or more than a month, or from one hour to 6 months, or from one hour to 1 month, or from 1 hour to one week, or from one hour to one day, or from one hour to 6 hours. In some embodiments, electrically conducting ion blocking layers have low ion conductivities, such as between $10^{-4}$ and $10^{-20}$ S/cm, and low electrical resistivity, such as less than 100 Ohm-cm. In some embodiments, electrically conducting ion blocking layers in EC multilayer stacks and devices have thicknesses less than approximately 250 microns.

In some cases, the electrical conductivity of the central transparent conductor ion blocking layer is high in the lateral direction (i.e., parallel to a major surface of the layer) and low in the vertical direction (i.e., perpendicular to the major surface of the layer). One such example is shown in the central transparent conductor ion blocking layer (1001) incorporated into multilayer stack 1000A, which contains a central insulating layer coated on both sides with central transparent conducting layers. In such cases, the central transparent conductor ion blocking layer (1001) has ionic conductivities from $10^{-4}$ to $10^{-20}$ S/cm in the vertical direction, electrical resistivity less than 100 Ohm-cm in the lateral direction, and electrical resistivity greater than 100 Ohm-cm in the vertical direction. A second example is shown in the central transparent conductor ion blocking layer (1001) incorporated into multilayer stack 1000B, which contains a single central layer. In such cases, the central transparent conductor ion blocking layer (1001) has ionic conductivities from $10^{-4}$ to $10^{-20}$ S/cm in the vertical direction, electrical resistivity less than 100 Ohm-cm in the vertical direction, and optionally also electrical resistivity less than 100 Ohm-cm in the horizontal direction. In some embodiments, the central transparent conductor ion blocking layer (1001) has ionic conductivities from $10^{-4}$ to $10^{-20}$ S/cm in the vertical direction, and electrical resistivity less than 100 Ohm-cm in either the lateral or vertical direction.

In some embodiments, the monolithic tandem EC stack contains 3, or 4, or 5, or 6, or 7, or 8, or 9, or 10, or more than 10, or from 2 to 20, or from 5 to 10, or from 2 to 15, or from 2 to 10 EC multilayer stacks.

In some embodiments, the monolithic tandem EC multilayer stack (1000A or 1000B) contains a first EC multilayer stack (1002) that in turn contains a first transparent conductor (1004), a first EC layer (1005) arranged on the surface of the first transparent conductor, a first IC layer (1006) arranged on the surface of the first EC layer, a second EC layer (1007) arranged on the surface of the first ion conducting layer. In some embodiment, the second EC layer is adjacent to the first surface of the central transparent conductor ion blocking layer (1001) in the monolithic tandem EC multilayer stack. In some embodiments, the first transparent conductor layer (1004) in the first EC multilayer stack (1002) has resistance to current flow substantially parallel to a major surface of the first electrically conductive layer that varies as a function of position within the first electrically conductive layer (i.e., is a gradient transparent conductor layer).

In some embodiments, the monolithic tandem EC multilayer stack (1000A or 1000B) contains a second EC multilayer stack (1003) that in turn contains a second transparent conductor (1011), a fourth EC layer (1010) arranged on the surface of the second transparent conductor, a second IC layer (1009) arranged on the surface of the third EC layer, a third EC layer (1008) arranged on the surface of the second ion conducting layer. In some embodiments, the third EC layer (1008) in the second EC multilayer stack (1003) is adjacent to the second surface of the central transparent conductor ion blocking layer (1001) in the monolithic tandem EC multilayer stack. In some embodiments, the second transparent conductor layer (1011) of the second EC multilayer stack (1003) has resistance to current flow substantially parallel to a major surface of the second electrically conductive layer that varies as a function of position within the second electrically conductive layer (i.e., is a gradient transparent conductor layer).

In some embodiments, the monolithic tandem EC multilayer stack (1000A or 1000B) contains a first outer substrate adjacent to the first transparent conductor layer and a second outer substrate adjacent to the fourth transparent conductor layer. In some embodiments, the first and second outer substrate material is selected from the group consisting of glass and plastic. Some examples of plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers.

In some embodiments, monolithic tandem EC multilayer stacks can be used in EC devices. Some applications include architectural or transportation. The architectural applications may include glass used on the exterior of the building such as windows or doors having insulated glass units (IGU's.) The architectural applications may also include interior applications such as partitions, windows, or doors.

Figure 5:
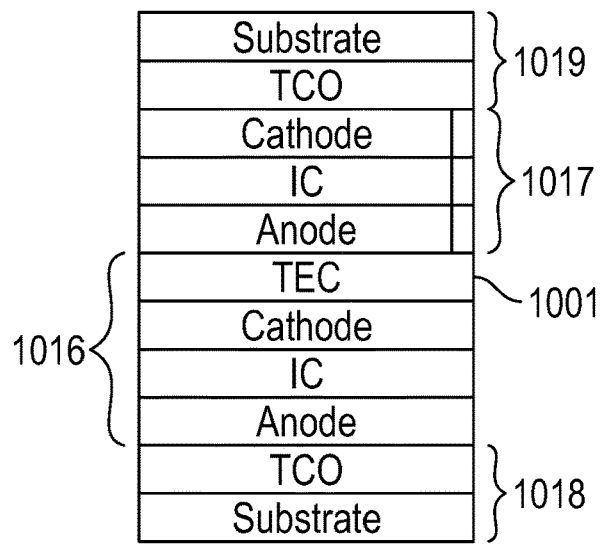
FIG. 5 shows an embodiment of a monolithic tandem EC multilayer stacks, which contains a central transparent conductor ion blocking layer, a first EC multilayer stack, and a second EC multilayer stack.

FIG. 5 shows an embodiment of a monolithic tandem EC multilayer stack containing a central transparent conductor ion blocking layer (1001), a first EC multilayer stack (1016), and a second EC multilayer stack (1017). In the example shown in FIG. 5, the first multilayer stack 1016 includes the central transparent conductor ion blocking TEC layer (1001), and the second multilayer stack 1017 contains only EC films with an IC in between. In the example shown in FIG. 5, the substrates 1018 and 1019 include outer "substrates" and the electrically conductive "TCO" layers. In some embodiments, an EC multilayer stack or sub-stack contains one or more EC layers and also contains a central transparent conductor ion blocking layer.

There are a number of advantages of stacking 2 or more EC multilayer stacks in a monolithic tandem stack. For example, the transmission in the dark state can be reduced by stacking two or more EC multilayer stacks in tandem. The schematic shown in FIG. 5 includes two EC multilayer stacks. In some embodiments, more than two EC multilayer stacks are repeated in a head-to-tail configuration (e.g., anode/IC/cathode/TEC//anode/IC/cathode/TEC//anode/IC/cathode/TEC// . . . ) in an EC device. One advantage of such devices is that each anode and cathode can be required to have a fraction of the charge capacity as would be needed for an EC device with only one anode and one cathode layer. Another advantage of such devices is that the depth of charge required for each anode and cathode can be less than a device with only one anode and one cathode layer. Repetitive cycling to the depth of charge required to achieve the same transmission in a single stack may be detrimental to the long term stability of the device. In this embodiment, the same transmission is achievable without negatively impacting the device lifetime. EC layers in such devices, therefore, can be also thinner than EC layers in conventional EC devices while achieving the same transmission. For example, if a device contained 10 EC multilayer stacks (e.g., 10 anode/IC/cathode/TEC stacks arranged head-to-tail) then each anode and cathode layer would only need to have $1/10^{th}$ of the charge capacity to achieve the same performance as compared to a device with only one anode and one cathode layer using the same or similar anode and cathode materials. Another advantage of monolithic tandem EC devices with multiple EC multilayer stacks integrated in series is lower operating currents and higher operating voltages (e.g., during device switching) than conventional EC devices with only one anode and/or cathode layer. The low operating current can be advantageous for a variety of reasons, including enabling the use of device wiring and associated electronics with low current carrying capabilities.

In some embodiments, the anode and the cathode layers in monolithic tandem EC multilayer stacks can be particle based electrochromic layers. For example, within the EC multilayer stack, one or more of the anode layers could be lithium nickel oxide nanostructure films, and/or one or more of the cathode layers could be tungsten oxide nanostructure films. More details on particle based EC films are described herein.

Series and Parallel EC Multilayer Stack Electrical Connections

In some embodiments, the monolithic tandem EC multilayer stack (e.g., 1000A or 1000B in FIG. 4) contains a first and second EC multilayer sub-stack (e.g., 1002 and 1003 in FIG. 4) that are electrically connected in series or in parallel.

FIG. 4 illustrates two embodiments of the monolithic tandem EC multilayer stack (1000A and 1000B) that contain a first and second EC multilayer stack (1002 and 1003) that are electrically connected in series.

The monolithic tandem EC multilayer stack 1000A is wired in series by orienting the cathode (1007) of the first EC multilayer stack adjacent to the central transparent conducting ion blocking layer, and orienting the anode (1008) of the second EC multilayer stack adjacent to the central transparent conducting ion blocking layer. In this embodiment, the central transparent conducting ion blocking layer contains an insulating film coated with conductive films, and electrical connection is made between the transparent conducting layers on either side of the central transparent conducting ion blocking layer with an electrically conductive member (i.e., a jumper wire) (1013). The circuit (1014) is electrically connected to the first electrically conducting layer 1004 and the second electrically conducting layer 1011. The circuit 1014 includes means for applying an external bias (e.g., using a power supply and driver) for switching both the first and second EC multilayer stacks together.

In some embodiments of the monolithic tandem EC multilayer stack 1000A, the first and second electrically conductive layers (1004 and 1011) contain gradient electrically conductive layers, and the transparent conducting layers on either side of the central transparent conducting ion blocking layer (1001) can also have gradient resistance across the layers (not shown in FIG. 4), such that the potential drops across the first and second EC multilayer sub-stacks are relatively uniform.

In other embodiments, (some of which are not shown in FIG. 4) the monolithic tandem EC multilayer stack 1000A could be wired in series or parallel by keeping the electrical connections (1013 and 1014) as shown in FIG. 4, and orienting the anode (1005) or the cathode (1007) of the first EC multilayer stack adjacent to the central transparent conducting ion blocking layer, and orienting the anode (1008) or the cathode (1010) of the second EC multilayer stack adjacent to the central transparent conducting ion blocking layer. In some embodiments, the EC multilayer stacks are electrically connected in series or parallel by electrically connecting the appropriate transparent conducting layers 1004 and 1011, and the appropriate transparent conducting layers on either side of the central transparent conducting ion blocking layer together with one or more jumper wires. The circuit through which an external bias is applied for switching both the first and second EC multilayer stacks can then be created by connecting the appropriate electrically conducting layers to power supply and driver circuitry. In the series or parallel connected cases wherein the central transparent conducting ion blocking layer cannot conduct electrical current vertically between the first and second EC multilayer stacks (e.g., in the 1000A example structure in FIG. 4), the first and second electrically conductive layer can contain gradients, and the transparent conducting layers on either side of the central transparent conducting ion blocking layer can also have gradient resistance across the layers (not shown in FIG. 4), and the potential drops across the first and the second EC multilayer stacks can be relatively uniform. Series connected EC multilayer stacks tend to have higher voltages and lower currents, while parallel connected EC multilayer stacks tend to have lower voltages and higher currents.

The monolithic tandem EC multilayer stack 1000B is wired in series by orienting the cathode (1007) of the first EC multilayer stack adjacent to the central transparent conducting ion blocking layer, and orienting the anode (1008) of the second EC multilayer stack adjacent to the central transparent conducting ion blocking layer. In this case, the central transparent conducting ion blocking layer can conduct current vertically through the layer to electrically connect the first and second EC multilayer stacks. In this case, in other words, there is no insulating layer in the central transparent conducting ion blocking layer preventing contact between the first and second EC multilayer stacks, and therefore there is no need for a jumper wire (e.g., 1013). The circuit (1015) is electrically connected to the first electrically conducting layer 1004 and the second electrically conducting layer 1011. The circuit 1015 includes means for applying an external bias (e.g., using a power supply and driver) for switching both the first and second EC multilayer stacks together. In this case, the first and second electrically conductive layer can contain gradients, and the central transparent conducting ion blocking layer can have a uniform resistance across the layer, and the potential drops across the first and second EC multilayer stacks can be relatively uniform.

In some embodiments, the electrical connection to electrically conductive layers in the multilayer stack(s) can be made using circuit boards or flexible circuit boards. In some embodiments, the layers in the multilayer stack(s) can include overhangs, which serve to expose one of the electrically conductive layers. In some embodiments, bus bars are connected to the electrically conductive layers in the multilayer stack(s) to facilitate electrical connection. In some embodiments, the electrical connection is a direct electrical connection created using soldering or ultrasonic welding.

Methods for Producing Monolithic Tandem Ec Multilayer Stacks

Figure 6:
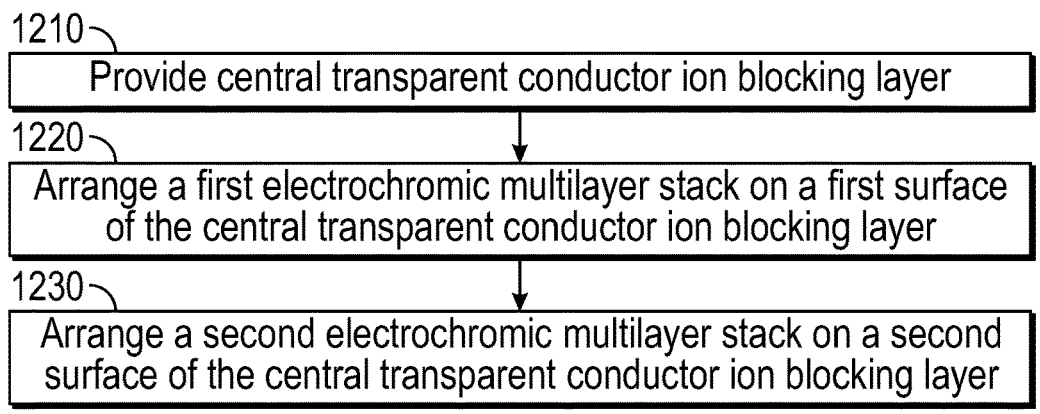
FIG. 6 shows a method for producing a monolithic tandem EC multilayer stack, in some embodiments.

FIG. 6 shows a method for producing a monolithic tandem EC multilayer stack, in some embodiments. In some embodiments, the method for producing a monolithic tandem EC multilayer stack includes, providing central transparent conductor ion blocking layer (1210), arranging a first EC multilayer stack on a first surface of the central transparent conductor ion blocking layer (1220), and arranging a second EC multilayer stack on a second surface of the central transparent conductor ion blocking layer (1230).

In some embodiments, the central transparent conductor ion blocking layer is a free-standing substrate that has sufficiently high electrical conductivity and sufficiently low ion conductivity and is made from multiple layers (e.g., glass or polyethylene terephthalate (PET) coated on both sides (i.e., bifacially) with transparent conductor layers). Alternatively, the central transparent conductor ion blocking layer can be a free-standing substrate that has sufficiently high electrical conductivity and sufficiently low ion conductivity and is made from a single layer of a single material or composite material. When such free-standing substrates are used, then the monolithic tandem EC multilayer stack can be produced using the central transparent conductor ion blocking layer as a substrate upon which the first and second EC multilayer stack can be deposited on both sides of the central transparent conductor ion blocking layer.

Figure 7:
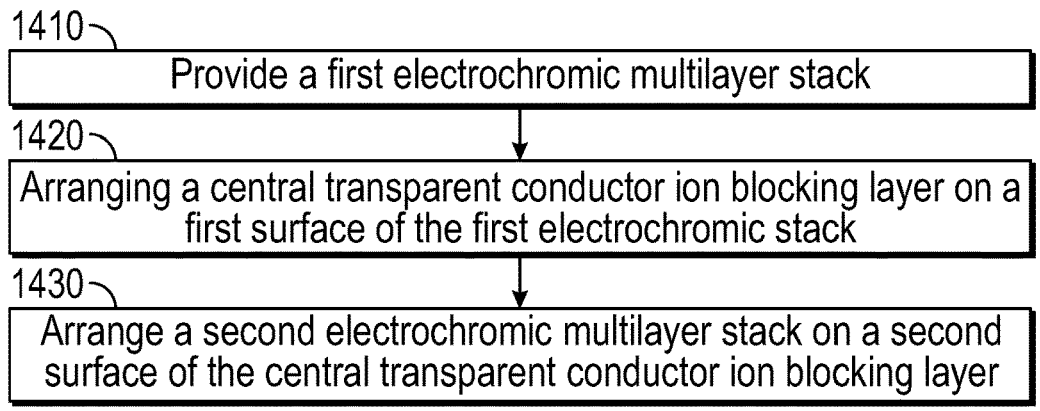
FIG. 7 shows a method for producing a monolithic tandem EC multilayer stack, in some embodiments.

FIG. 7 shows a method for producing a monolithic tandem EC multilayer stack, in some embodiments. In some embodiments, the first EC multilayer stack is provided (e.g., deposited on a substrate (e.g., glass or plastic)) (1410), and then the central transparent conductor ion blocking layer can be arranged (e.g., deposited as a film) on the first EC multilayer stack (1420). Then, the second EC multilayer stack can be arranged (e.g., deposited) on the other side of the central transparent conductor ion blocking layer (1430). In these embodiments, the central transparent conductor ion blocking layer is not required to be free-standing since it is not utilized as a substrate. In such methods, the layers comprising the central transparent conductor ion blocking layer and the second EC multilayer stack can be deposited using a variety of techniques such as wet coating techniques, spray deposition techniques, and vacuum deposition techniques.

Figure 8:
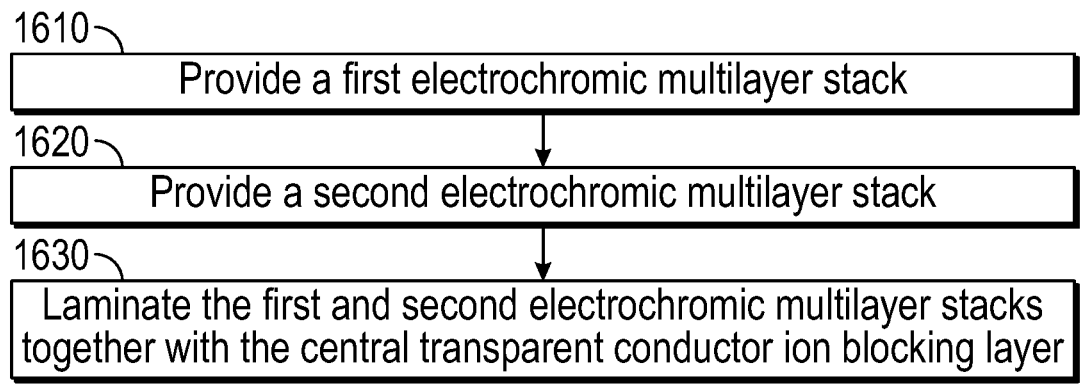
FIG. 8 shows a method for producing a monolithic tandem EC multilayer stack, in some embodiments.

FIG. 8 shows a method for producing a monolithic tandem EC multilayer stack, in some embodiments. In some embodiments, the first EC multilayer stack is provided (e.g., deposited on a substrate (e.g., glass or plastic)) (1610), the second EC multilayer stack is provided (e.g., deposited on a substrate (e.g., glass or plastic)) (1620), and the first and second EC multilayer stack are subsequently laminated together using a central transparent conductor ion blocking layer in between the EC multilayer stacks (1630) to create a monolithic tandem EC multilayer stack (e.g., as shown in FIG. 4 element 1000A or 1000B). In these embodiments, the central transparent conductor ion blocking layer acts as a laminating or lamination layer. In some embodiments, the central transparent conductor ion blocking layer is an adhesive layer that is capable of holding together the first and second EC multilayer stacks after a lamination process. In other embodiments, the central transparent conductor ion blocking layer has one or more adhesive layers on each side of the layer that are capable of holding together the first and second EC multilayer stacks after a lamination process.

The methods described herein do not particularly limit the EC multilayer stack processing methods, and any type of deposition for the electrochromic layers, ion conducting layers, and electrically conductive layers can be employed. Some non-limiting examples of deposition techniques are wet coating techniques, spray deposition techniques, and vacuum deposition techniques.

In some embodiments, however, the processing temperature of the EC multilayer stacks can be limited. For example, if the electrochromic layers are deposited on plastic substrates with melting points below that of glass, then the processing temperature can be limited to below the melting point of the substrate. Another example of a method where the processing temperature could be limited is a method in which a central transparent conductor ion blocking layer made from an organic matrix is used as a free-standing substrate upon which the EC multilayer stacks are deposited. Methods for forming EC layers and gradient electrically conducting layers using low temperature processing can therefore be particularly useful for fabricating EC multilayer stacks in certain monolithic tandem EC multilayer stacks. One example of a low temperature processing method for EC layers is the method of forming EC particles of nanostructures, and then depositing the particles or nanostructures to form an EC layer, as described above. One example of a low temperature processing method for gradient electrically conductive layers is the method of providing low temperature, low sheet resistance transparent conductive materials, such as composite materials with wire meshes, nanowire meshes, carbon nanotube meshes, particulate coatings, and/or nanoparticulate coatings dispersed in a matrix, depositing those materials to form a layer, and then patterning that layer using laser ablation to form a gradient electrically conductive layer, as described above.

Figure 9:
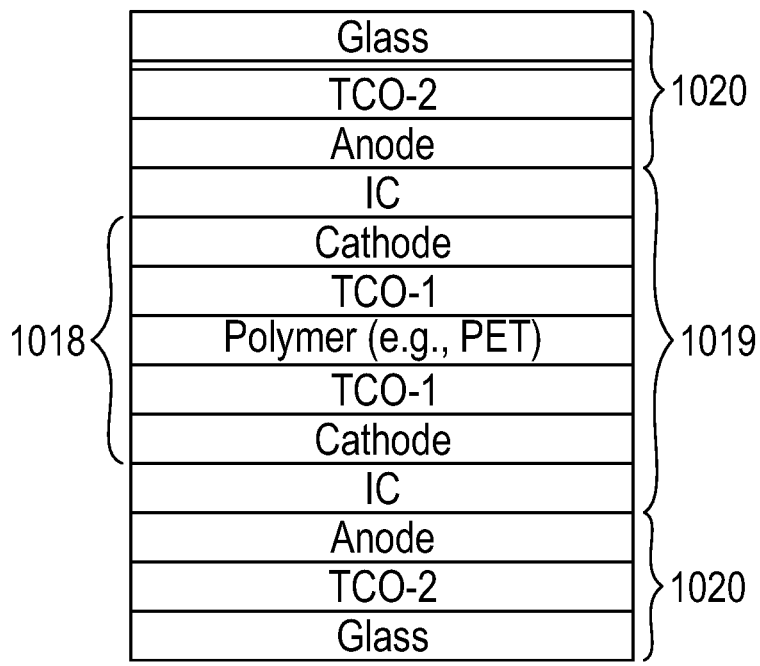
FIG. 9 shows an embodiment of a monolithic tandem EC multilayer stacks, which contains a central transparent conductor ion blocking layer, a first EC multilayer stack, and a second EC multilayer stack, to illustrate a method for producing a monolithic tandem EC multilayer stack, in some embodiments.

FIG. 9 shows an embodiment of a monolithic tandem EC multilayer stack containing a central transparent conductor ion blocking layer (containing the three layer stack "TCO-1"/"Polymer (e.g., PET)"/"TCO-1"). The figure shows an EC multilayer stack 1018 containing the central transparent conductor ion blocking layer, and two cathode films, one deposited on each surface of the central transparent conductor ion blocking layer (deposited bifacially). The figure also shows an EC multilayer stack 1019 containing the central transparent conductor ion blocking layer, two cathode films, one deposited on each surface of the central transparent conductor ion blocking layer, and two IC films, one deposited on each deposited cathode. FIG. 9 also shows two EC multilayer stacks 1020 containing a substrate, a TCO layer, and an anode layer deposited on the substrate/TCO.

The structure shown in FIG. 9 can be fabricated by different methods for producing a monolithic tandem EC multilayer stack, in different embodiments. In some embodiments, the first EC multilayer stack 1018 is provided, two EC multilayer stacks 1020 are provided, and 1018 is laminated to two 1020 stacks to form the structure shown in FIG. 9 using the IC layers in the figure as the adhering lamination layers. In some embodiments, the first EC multilayer stack 1019 is provided (e.g., with two IC layers deposited onto each side of EC multilayer stack 1018), two EC multilayer stacks 1020 are provided, and 1019 is laminated to two 1020 stacks to form the structure shown in FIG. 9 using the IC layers as the adhering lamination layers.

In some embodiments, the structure shown in FIG. 9 can contain an IC layer made from GMA/acrylate. In some embodiments, the structure shown in FIG. 9 can contain lithium nickel metal oxide anode layers deposited via sol-gel methods on glass substrates. In some embodiments, the structure shown in FIG. 9 can contain cathode layers deposited from particles on the TCO-coated polymer substrate, since particle-based cathode layers can have processing temperatures that are compatible with the central transparent conductor ion blocking layer (containing the three layer stack "TCO-1"/"Polymer (e.g., PET)"/"TCO-1" shown in FIG. 9).

Free-Standing Ion Conducting Substrates for EC Multilayer Stacks

In some embodiments, monolithic tandem EC multilayer stacks can be produced using central transparent conductor ion blocking layers that are free-standing substrates (e.g., in some of the methods described above). Additionally, in some embodiments, monolithic tandem EC multilayer stacks can be produced using free-standing ion conducting layers, which act as laminating adhesive layers to connect central transparent conductor ion blocking layers to EC multilayer stacks (e.g., in some of the methods described above). This section describes some embodiments of free-standing ion conducting layers (i.e., substrates) that can be used to fabricate EC multilayer stacks and devices, including monolithic tandem EC multilayer stacks as well as single EC multilayer stacks (i.e., that are not part of tandem EC multilayer stacks).

Figure 10:
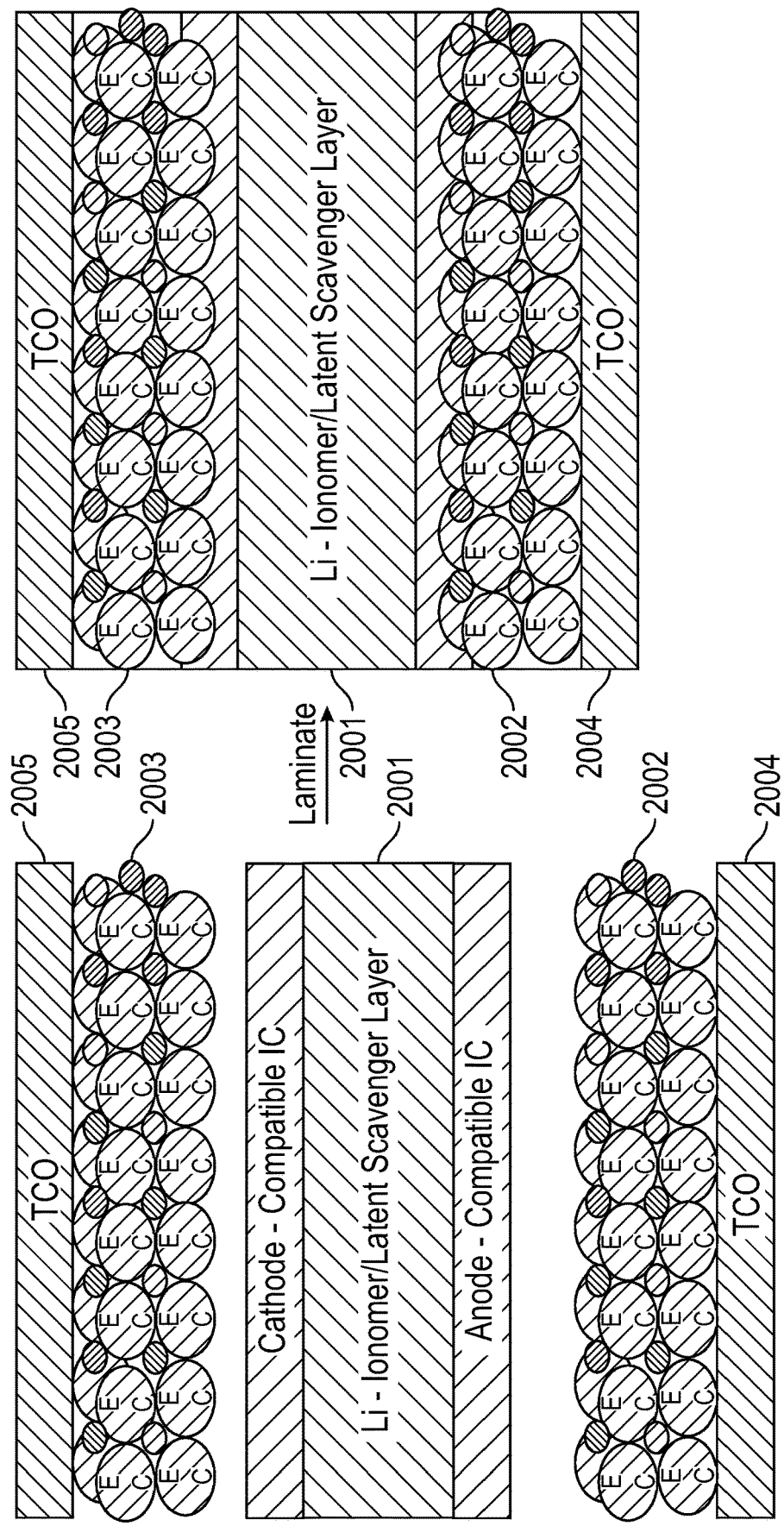
FIG. 10 shows the cross section of a free-standing ion conducting substrate (FICS) for an EC multilayer stack.

FIG. 10 shows the cross section of a free-standing ion conducting substrate (FICS) 2001 for an EC multilayer stack. In some embodiments, protective layers (not shown) are arranged on one or both sides of the FICS to create a multilayer stack. Protective layers can provide the anode and/or cathode with a chemically optimized IC interface to improve optics (e.g., through refractive index matching), adhesion, and/or enhanced stability during cycling. In addition, the protective layers may provide a physical/chemical barrier for the absorption of moisture or other reactive components in ambient air (e.g., $O_2$, $CO_2$). In some embodiments, EC layers (2002 and 2003) are arranged on either side of the FICS to create an EC multilayer stack. In some embodiments, transparent conducting layers (2004 and 2005) are arranged on the outside surfaces of the EC layers in the EC multilayer stack.

Some examples of the organic matrix in the FICS are an acrylate, an acrylate with an epoxide, a cross-linked polymer network, other well-known, weatherable polymer systems with (such as silicones, urethanes), and mixtures thereof. In some embodiments, the polymer organic matrix is hydrophilic and absorbs moisture from the atmosphere. The amount of water absorbed (at equilibrium) depends on the temperature and relative humidity of the atmosphere and the composition of the polymer. In some embodiments, polymers suitable for the FICS use will absorb less than 10000 ppm in a room temperature environment (e.g., at approximately 23° C., or from 20° C. to 25° C.) with from approximately 10% to approximately 30% relative humidity.

In some embodiments, FICS 2001 comprises an electrolyte salt component to function in an EC device. Some examples of electrolyte salts of lithium and chemically stable and non-coordinating anions are triflate, TFSI, and perchlorate.

In some embodiments, the electrolyte salt is present in sufficient concentration to provide high ion conductivity. Additionally, in some embodiments, low molecular weight plasticizers such as ethylene carbonate, propylene carbonate, oligomeric polyethers, and sulfolane are included in the FICS. FICS films comprising electrolyte salts at the molarity useful in an EC device typically absorb water rapidly and to substantially higher levels than when the electrolyte salt is absent. The root cause of increased water absorption can be the presence of high molar concentrations of free-cation (e.g., Li+) that strongly bind to water to form polyhydrates. Equilibrium absorbed water concentrations greater than 2.0M are common in IC films exposed to the atmosphere, resulting in an increase of mass of over 5%. As a result, in some embodiments, FICSs formulated using soluble electrolyte salts are preferably stored and used in an ultra-dry atmosphere. The mechanical integrity and adhesive properties of FICSs comprising mobile electrolyte salts such as LiTFSI can also be degraded by water absorption. Furthermore, water is typically a device "poison" (i.e., degrades device performance) and can even cause device failure when present in high concentrations.

In some embodiments, FICS films are formulated with electrolyte components that are not hygroscopic and thus do not substantially increase the rate and magnitude of water absorption. In some embodiments, FICS films are designed such that device fabrication/lamination processes can operate in a standard "dry room" (e.g., in air, and not under nitrogen). In some embodiments, the ion conducting substrate is formulated with precursors that are not hygroscopic and thus do not cause rapid water absorption when dispersed in the FICS matrix. In some embodiments, the non-hygroscopic precursors are chemically reacted at elevated temperatures during lamination to generate the desired electrolyte salt. In some embodiments, volatile byproducts in the FICS are removed prior to lamination, or are chemically compatible with the EC device and remain dissolved in the ion-conducting film after reacting during lamination. In some embodiments, the FICS absorbs less than 1000 ppm, or less than 10000 ppm of water at equilibrium in an environment at a temperature of approximately 25° C., and a relative humidity from approximately 10% to approximately 30%.

In some embodiments, the materials providing a mobile alkali ion in the FICS contain alkali precursors and salts of an electrolyte anion that react at temperatures greater than 80° C., 90° C., 100° C., 110° C., 120° C., 130° C., 140° C. and 150° C. to produce mobile lithium ions. Some examples of the alkali precursors are $Li_2CO_3$, $Li_2O_2$, and mixtures thereof. One useful example of a non-hygroscopic salt of an electrolyte anion is $QH^+Anion^-$, where Q is an organic neutral base and QH⁺ is sufficiently acidic to react with an alkali metal precursor. For example, $Li_2CO_3$ forms $LiHCO_3$ (lithium bicarbonate) and Li⁺Anion⁻ electrolyte after reaction. Some examples of pairs of alkali precursors and salts of an electrolyte anion that react at temperatures greater than 80° C., or greater than 100° C., or greater than 120° C., or from approximately 80 to 150° C. to produce mobile lithium ions are $Li_2CO_3/R_3PH+TPFI$-, $Li_2O_2/R_3NH$+triflate-, and mixtures thereof. After the FICS is incorporated into a multilayer stack or a device and protected from the environment (e.g., protected from moisture exposure), then an anneal step can initiate the reaction of the alkali precursors and salts of an electrolyte anion to produce mobile lithium ions.

In some embodiments, the electrolyte anion moiety may be covalently attached to the FICS polymer matrix and in some embodiments the acidic cationic moiety used to "deliver" the electrolyte anion may be attached (or tethered) to the FICS polymer matrix.

In some embodiments, the materials providing a mobile alkali ion in the FICS contain particles of a conventional solid state alkali ion conductor, and an alkali ion salt that is soluble in the organic matrix. In this embodiment, a conventional solid state material, i.e., a material with a crystalline extended lattice, can perform the function of host to the alkali ion in much the same manner as the polymeric material described previously. Some examples of solid state alkali ICs are $Li_xCoO_2$, $Li_xMO_2$ (where M is a transition metal), $Li_{10}GeP_2S_{12}$, $Li_7P_3S_{11}$, $Li_2S$, $\gamma$-$Li_3PS_4$, $Li_4GeS_4$, and mixtures thereof. Additional examples of suitable solid state alkali IC layers include silicates, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the solid state IC comprises a silicate-based structure. In other embodiments, suitable solid state ICs particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide. Some examples of alkali ion salts that are soluble in the organic matrix are, LiTFSI (lithium bis(trifluoromethane) sulfonimide), $LiBF_4$ (lithium tetrafluoroborate), $LiPF_6$ (lithium hexafluorophosphate), $LiAsF_6$ (lithium hexafluoro arsenate), $LiCF_3SO_3$ (lithium trifluoromethane sulfonate), $LiB(C_6F_5)_4$ (lithium perfluorotetraphenylboron) and $LiClO_4$ (lithium perchlorate), and mixtures thereof.

In some embodiments, an additional solvent is used to solubilize the alkali ion salt in the FICS. Some examples of solvents are sulfolane, ethylene carbonate, diethyl carbonate, and mixtures thereof. Additionally, the solvent can function as a plasticizer for FICS and/or for the organic matrix. In some embodiments low molecular weight oligomers may be used to solubilize and improve the mobility of the alkali ion salt in the FICS.

Not to be limited by theory, in some cases solid state alkali ICs have poor ion conduction properties across interfaces between the solid state IC and adjacent EC layers. The purpose of the alkali ion salt that is soluble in the organic matrix is to produce mobile alkali ions that are intermediate ICs (i.e., shuttles) to improve the conduction of alkali ions between the solid state alkali IC and an adjacent EC layer.

Minimizing the concentration of soluble lithium ion in the FICS is advantageous because mobile lithium or alkali ions tend to rapidly absorb water from the atmosphere. One object of this embodiment is to provide a FICS film that can be handled in ambient atmospheres (e.g., air-based dry rooms, and not ultra-dry nitrogen environments) without substantial water absorption. For example, the ratio of the concentration of the mobile alkali ions to the concentration of solid state alkali ICs can be 0.005 mol/0.5 mol, or 0.01 mol/0.5 mol, or 0.05 mol/0.5 mol, or from a ratio of 1/100 to a ratio of 1/10, or from a ratio of 1/50 to a ratio of 1/10.

In some embodiments, FICSs can contain a first surface that is modified to be compatible with a cathodic EC layer, and a second surface that is modified to be compatible with an anodic EC layer. Some examples of FICSs with modified surfaces are a central FICS layer comprising poly-(methyl vinyl ether-co-maleic anhydride) where the first and/or second surface is modified with a polar lightly crosslinked polyacrylate. Another example is a central FICS layer comprising poly-(styrene-co-maleic anhydride) where the first and/or second surface is modified with a polar lightly crosslinked polyacrylate. Yet another example is a central layer comprising a copolymer with pendent carboxylate groups, such as carboxylic acid and alkali salts of carboxylic acid groups, where the first and/or second surface is modified with a polar lightly crosslinked polyacrylate. In some embodiments, such modified surfaces allow the central layer in the FICS film to comprise chemical functionality that benefits device performance (e.g., scavenges water, oxygen, and other impurities that may damage the device) but would degrade device performance if said chemical functionality were to be in direct contract with the electrodes. In other embodiments, the FICS surface is modified with a material that repels or otherwise inhibits absorption of water and/or oxygen when the FICS is exposed to air. Examples include thin dense composite films comprising inorganic materials, such as lithium carbonate, which tend to reduce water absorption rates. Still further examples are coatings that are identical in composition to the central layer of the FICS but that do not comprise mobile lithium ions. Other examples include polymers such as fluorinated polymers including polyvinylidene fluoride, which is used as a binder in some battery electrodes.

In some embodiments the FICSs described herein have a thickness that is approximately 10 microns, or approximately 25 microns, or approximately 50 microns, or approximately 100 microns, or approximately 200 microns, or approximately 300 microns, or approximately 400 microns, or from 5 to 500 microns, or from 5 to 300 microns, or from 5 to 200 microns, or from 100 to 500 microns, or from 5 to 100 microns, or from 5 to 50 microns, or from 5 to 30 microns, or from 10 to 30 microns, or from 10 to 100 microns.

In some embodiments, FICSs can be used to fabricate an adhesive EC half-cell, containing a transparent conductive layer, an EC layer on the transparent conductive layer, and the FICS on the EC layer. The FICSs could be coated with an adhesive, or could be an adhesive itself. In some embodiments, the adhesive EC half-cell could then be adhered to a counter electrode to form the EC multilayer stack. In some embodiments, two or more adhesive EC half-cells containing FICSs could then be adhered to a central transparent conductor ion blocking layer that is coated with a complementary EC film (or a counter electrode) to form a monolithic tandem EC multilayer stack.

In some embodiments, EC layers or EC layers and transparent conductor layers are arranged on both surfaces of the FICS and the EC layers or EC layers and transparent conductor layers effectively block ambient moisture from reaching the FICS. In some embodiments, EC layers or EC layers and transparent conductor layers are arranged on both surfaces of the FICS and the EC layers or EC layers and transparent conductor layers have a lower water ingress rate than the FICS itself. In these embodiments, the requirements for moisture absorption at equilibrium for the FICS can be relaxed, since the EC layers or the EC layers and the electrically conductive layers create a barrier for moisture ingress into the FICS.

In some embodiments, FICSs can be used to fabricate EC multilayer stacks for EC devices. Some applications include architectural or transportation. The architectural applications may include glass used on the exterior of the building such as windows or doors having insulated glass units (IGUs.) The architectural applications may also include interior applications such as partitions, windows, or doors.

Figure 11:
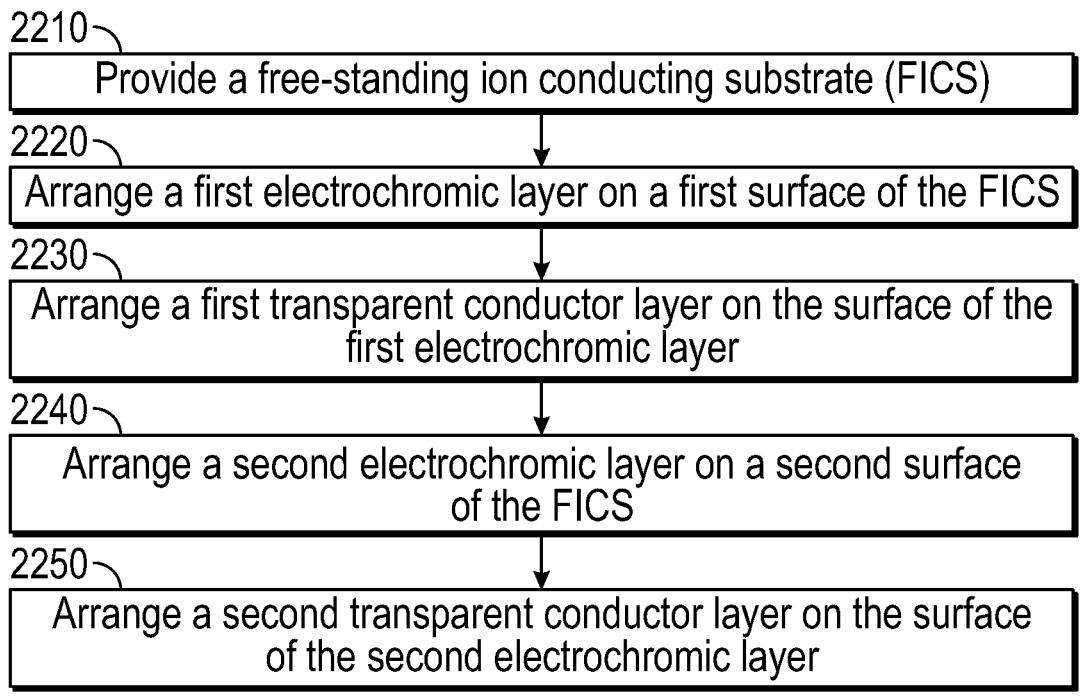
FIG. 11 shows a method for producing an EC multilayer stack, in some embodiments.

Methods for Producing EC Multilayer Stacks Using Free-Standing Ion Conducting Substrates FIG. 11 shows a method for producing an EC multilayer stack, in some embodiments. In some embodiments, a method of producing an electrochromic multilayer stack, includes providing a free-standing ion conducting substrate (FICS) (2210), arranging the first electrochromic layer on a first surface of the free-standing ion conducting substrate (2220), arranging the first transparent conductor layer on the surface of the first electrochromic layer (2230), arranging the second electrochromic layer on a second surface of the free-standing ion conducting substrate (2240), and arranging the second transparent conductor layer on the surface of the second electrochromic layer (2250). In some embodiments, the first and/or second transparent conducting layer has a resistance to current flow substantially parallel to a major surface of the first electrically conductive layer that varies as a function of position within the first electrically conductive layer.

In some embodiments of the method shown in FIG. 11, the first and second electrochromic layers are arranged on the first and second surfaces of the free-standing ion conducting substrate (FICS) using a continuous roll-to-roll process. For example, the roll-to-roll process can include at least one wet coating step, at least one anneal step, and/or at least one vacuum deposition step.

Figure 12:
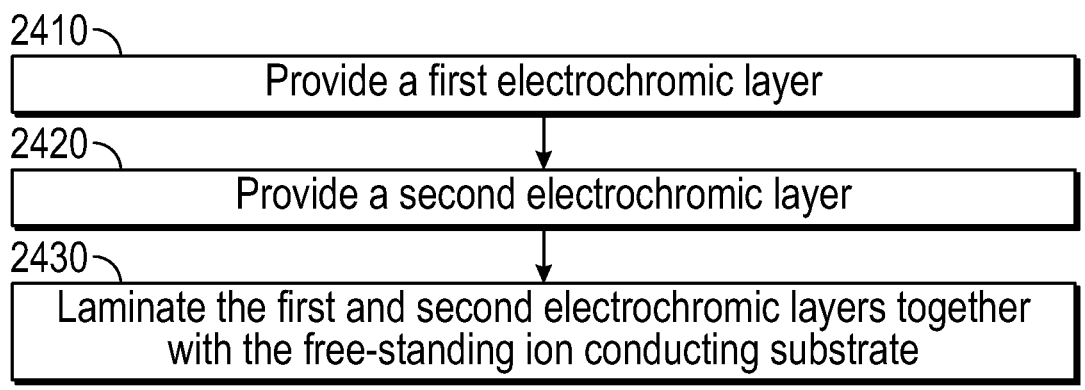
FIG. 12 shows a method for producing an EC multilayer stack, in some embodiments.

FIG. 12 shows a method for producing an EC multilayer stack, in some embodiments. In some embodiments, a method of producing an electrochromic multilayer stack, includes providing a first EC layer (2410), providing a second EC layer (2420), and laminating the first and second EC layers together using a FICS (2430). In these embodiments, the FICS acts as a laminating or lamination layer. In some embodiments, the FICS is an adhesive layer that is capable of holding together the first and second EC multilayer stacks after a lamination process.

In some embodiments of the above method shown in FIG. 12, a first transparent electrically conductive layer can be deposited on a first substrate, and the first electrochromic layer (2410) can be deposited on the first transparent electrically conductive layer. Additionally, a second transparent electrically conductive layer can be deposited on a second substrate, and the second electrochromic layer (2420) can be deposited on the second transparent electrically conductive layer. Then the first and second substrates, including the first and second transparent electrically conductive layers and the first and second EC layers can be laminated together using a FICS (2430) to form an EC multilayer stack. In such embodiments, the first and second substrates can be glass, and the transparent conductive layers and the EC layers can be deposited with any methods compatible with glass substrates (e.g., with processing temperatures below approximately 550° C.). In other embodiments of the method above, the first and second substrates can be plastic, and the transparent conductive layers and the EC layers are deposited using low temperature methods (e.g., particle-based EC films, and composite electrically conductive layers, as described above).

In some embodiments of the method shown in FIG. 12, a first and a second flexible substrate is coated with transparent conducting layers using a continuous roll-to-roll process. In some embodiments, the first and second electrochromic layers are then arranged on the coated flexible substrates using a continuous roll-to-roll process. Additionally, in some embodiments, the first and second electrochromic layers are laminated together using the free-standing ion conducting substrate (FICS) using a continuous roll-to-roll process.

Figure 13:
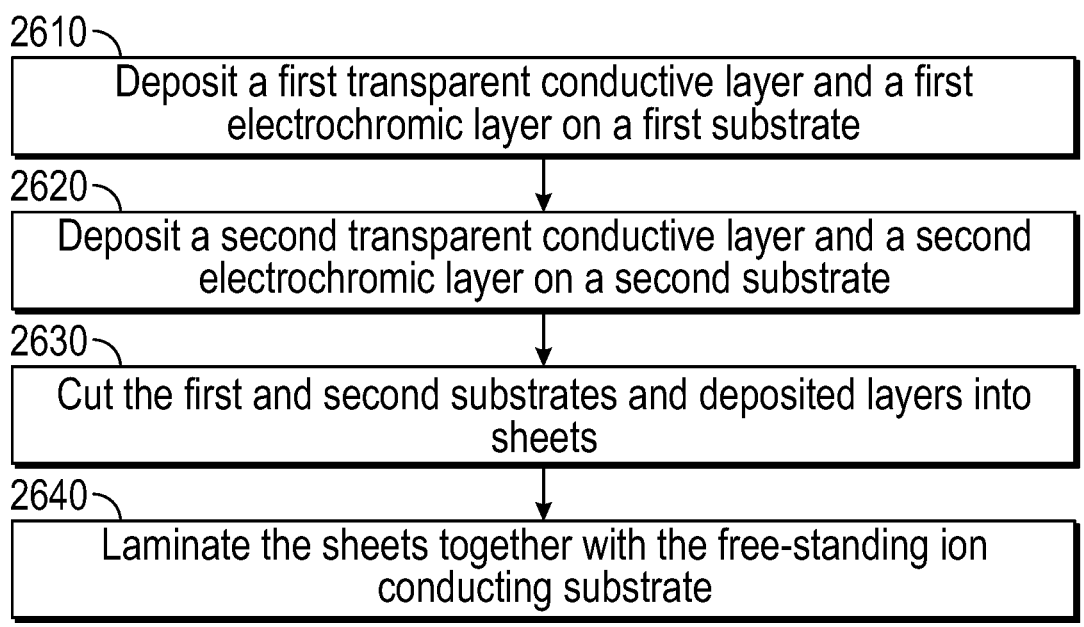
FIG. 13 shows a method for producing an EC multilayer stack, in some embodiments.

FIG. 13 shows a method for producing an EC multilayer stack, in some embodiments. In some embodiments, a first transparent electrically conductive layer can be deposited on a first substrate, and the first electrochromic layer (2610) can be deposited on the first transparent electrically conductive layer. Additionally, a second transparent electrically conductive layer can be deposited on a second substrate, and the second electrochromic layer (2620) can be deposited on the second transparent electrically conductive layer. Next, the first and second substrates, including the deposited layers (i.e., the first and second transparent electrically conductive layers and the first and second EC layers) can be cut into individual sheets (2630). Then, the first and second substrate sheets, including the deposited layers (i.e., the first and second transparent electrically conductive layers and the first and second EC layers), can be laminated together using a FICS (2640) to form an EC multilayer stack.

In some embodiments of the above method (shown in FIG. 13), the first and second transparent electrically conductive layer can be deposited on the first and second substrate respectively (2610 and 2620), using a roll-to-roll process. In some embodiments of the above method, the first and second electrochromic layer can be deposited on the first and second transparent electrically conductive layer respectively (2610 and 2620), using a roll-to-roll process. In some embodiments of the above method, the first and second substrates can be plastic (e.g., polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers). In some embodiments of the above method, the first and second substrates can be laminated together using the FICS (2640) in a batch lamination process.

In some embodiments and/or variations of the methods shown in FIGS. 11-13, the methods are used to fabricate tandem EC multilayer stacks, or monolithic tandem EC multilayer stacks. For example, the method shown in FIG. 13 can be modified and/or combined with a variation of the method shown in FIG. 8. In such a method, a first EC multilayer stack containing one or more EC layers is provided, a second EC multilayer stack containing one or more EC layers is provided, and the first and second EC multilayer stack are subsequently laminated together using a central transparent conductor ion blocking layer containing one or more FICS layers to create a monolithic tandem EC multilayer stack. In these embodiments, the central transparent conductor ion blocking layer containing the FICS layer(s) acts as a laminating or lamination layer.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1

Hydrothermal Synthesis of Hexagonal Tungsten Trioxide Nanostructures

Figure 14:
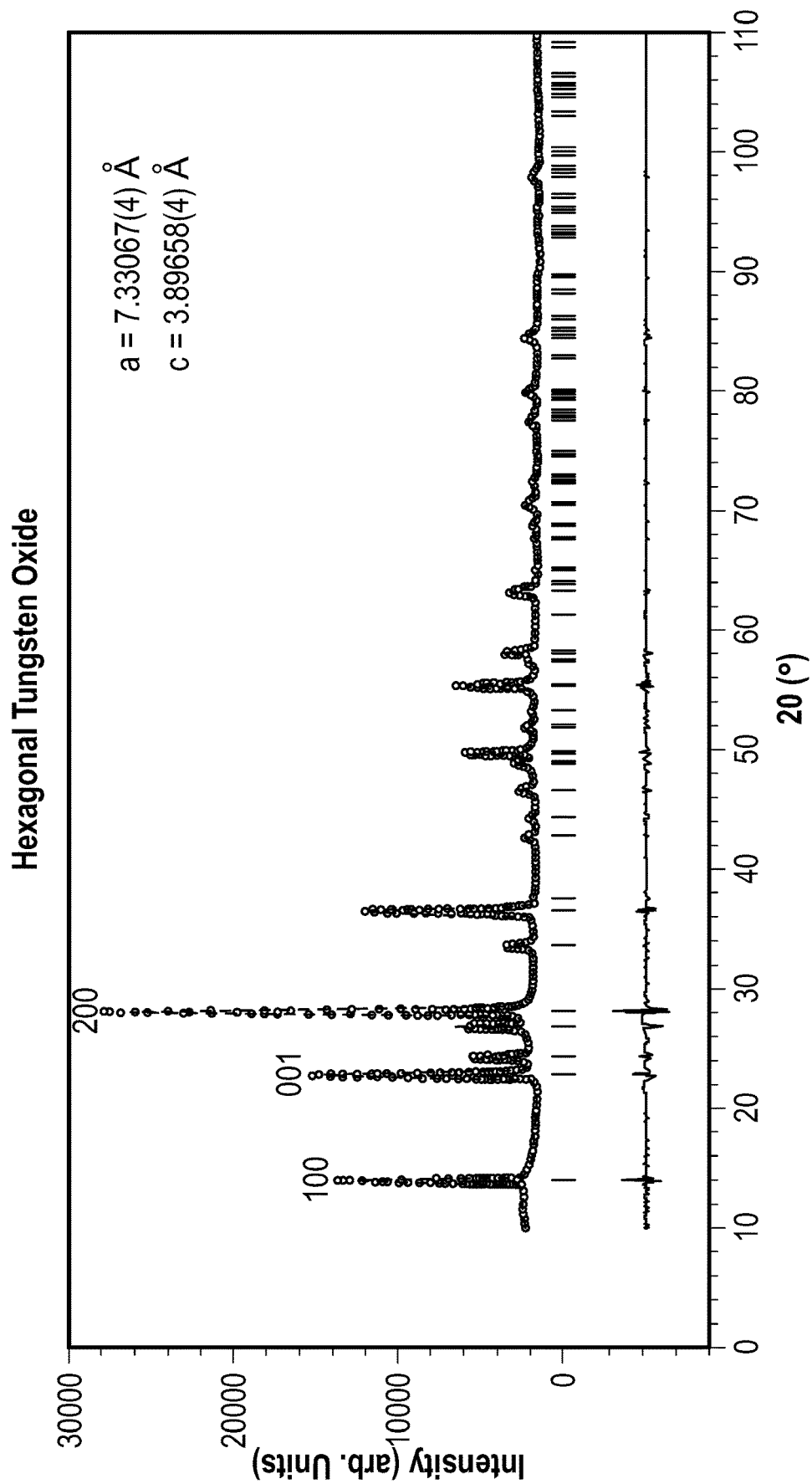
FIG. 14 is an x-ray diffraction (XRD) pattern of hexagonal tungsten trioxide particles.

FIG. 14 shows an example x-ray diffraction (XRD) pattern of hexagonal tungsten trioxide particles prepared using hydrothermal synthesis. This XRD pattern of the as-synthesized product may be fit to a crystal structure of the space group P6/mmm (#191), where the lattice parameters are a=b=approximately 7.3 (Angstroms), and c=approximately 3.9 (Angstroms). The hexagonal tungsten trioxide particles were prepared according to the following procedure.

A 125 mL steel autoclave vessel with a Teflon insert is used. 5.0 g of $Na_2WO_4*2H_2O$ and 1 g of NaCl is added to 45 ml of DI $H_2O$. The pH is monitored, and the starting pH is typically 9.1 to 9.3. 3M HCl is rapidly added, until the pH is equal to 1.5, and the solution turns a light green color. The reaction mixture is then loaded into the autoclave vessel, and heated to 180° C. for 6 hours.

After the reaction products cool to room temperature, the supernatant liquid is discarded, and the precipitate product is collected into a centrifuge tube using DI water. DI water is used to dilute the product to a total of about 45 mL, and then centrifuged at 4500 RPM for 4 min. The supernatant is again discarded, and DI $H_2O$ is added to the precipitate to get 25 mL total volume. A second centrifuge procedure is performed at 4500 RPM for 4 min. The supernatant is again discarded, and the centrifuge procedure is repeated two more times, diluting each time with isopropanol. After decanting the isopropanol, the centrifuge tubes are dried in a vacuum environment. After drying, the powder is ground with a mortar and pestle and is further dried before the XRD pattern in FIG. 14 was taken. The yield of the hexagonal tungsten trioxide from this process is typically 3.2 (+/−0.1) g.

The x-ray diffraction (XRD) pattern in FIG. 14 shows narrow peaks, indicating a high degree of crystallinity. Samples were analyzed using a Bruker D8 Advance diffractometer employing CuKα radiation. Scans were made in Bragg-Brentano geometry using a Ni filter between 5-110° 2Θ with a step size of 0.01° Intensities of the (100), (001) and (200) peaks indicate that the crystallinity does not have a preferred orientation. In contrast, nanowires would typically show a preferred orientation, indicating that the material formed does not have the crystalline structure of nanowires.

Example 2

Size Reduction of Hexagonal Tungsten Trioxide Nanostructures

Figure 15:
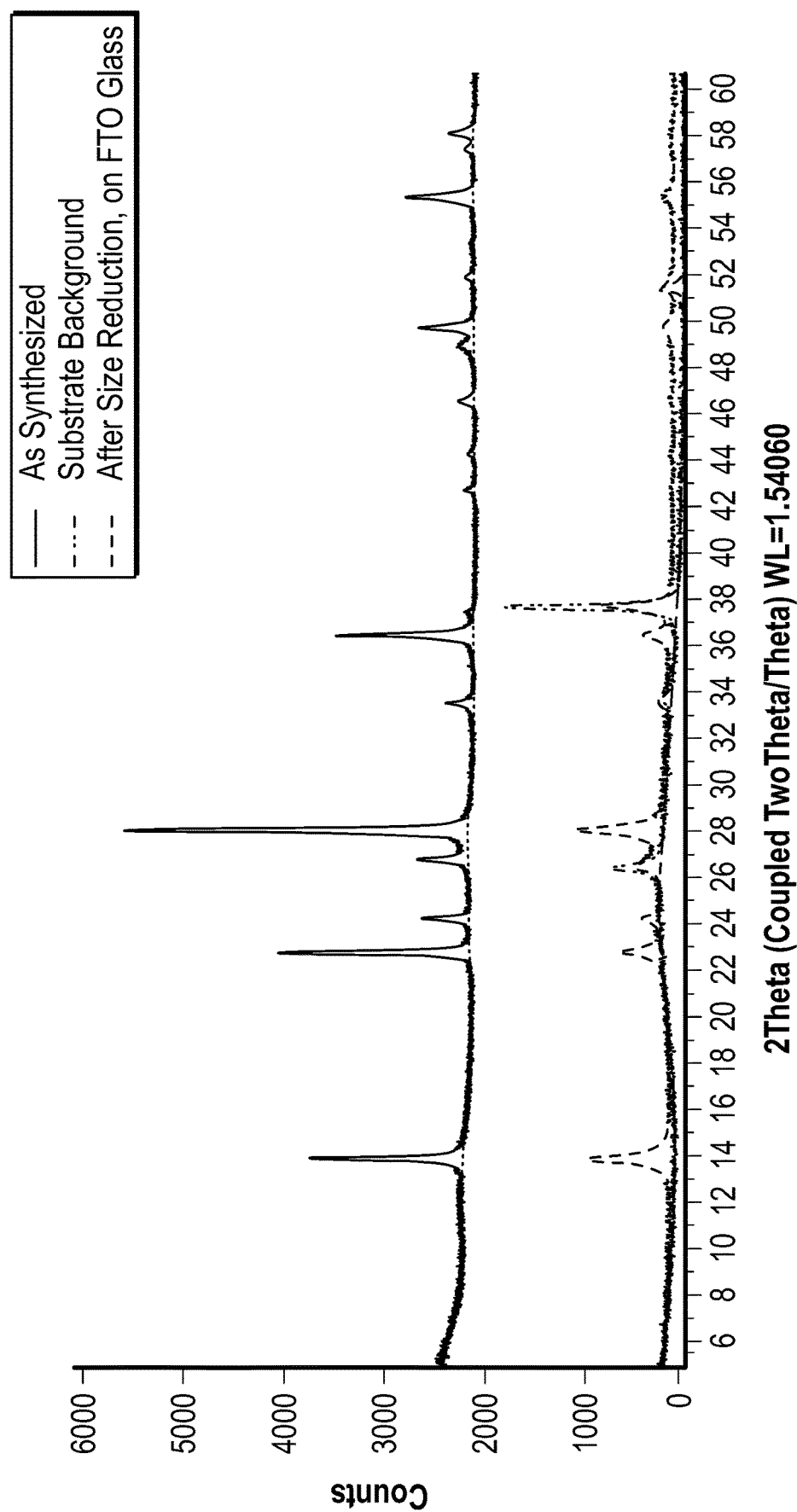
FIG. 15 is an XRD pattern of hexagonal tungsten trioxide as-synthesized material, and after size-reduction and coating on a substrate.

FIG. 15 shows an XRD pattern of the hexagonal tungsten trioxide "starting material" (i.e. the as-synthesized material as described in Example 1), and the materials after size reducing and coating on a substrate. Samples were analyzed using a Bruker D8 Advance diffractometer employing CuKα radiation. Scans were made in Bragg-Brentano geometry using a Ni filter between 5-110° 2Θ with a step size of 0.01°. In this example, the dried powder (as described in Example 1) is size-reduced by grinding using an agitator bead mill. The mill has 80 mL bowls with $ZrO_2$ liners. The milling media are 0.1 mm diameter $ZrO_2$ balls. The primary particle size of the starting material is approximately between 5 and 500 nm, however, agglomerates from 1 to 20 microns are also observed.

6.4 (+/−0.1) g of hexagonal tungsten trioxide material to be size-reduced by milling (e.g., product from 2 reaction batches using the synthetic procedure described in Example 1) is added to 30 mL of IPA (isopropanol) and 100 (+/−1) g of 0.1 mm $ZrO_2$ balls, in the bowl of the mill. The milling cycle parameters are 500 RPM for 3 min, followed by 5-9 min of rest time (to allow the mill bowls to cool). The cycle is repeated 20 times, for a total of 1 hour active milling time. The formulation is then extracted from milling bowls and filtered to separate the milling media from the formulation.

Additional IPA is then added to the milling bowls and the mixture is shaken and sonicated to remove any remaining hexagonal tungsten trioxide particles from the milling balls and bowl. This process is continued until a total formulation volume of 30-40 mL is achieved. After the final formulation volume is achieved, the slurry is characterized by TGA to determine weight %. An aliquot of the formulation is diluted and characterized by dynamic light scattering (DLS) for particle size analysis.

In this example, after milling, the hexagonal tungsten trioxide nanostructures are coated onto a substrate using slot die coating. The die lip to substrate gap is from 80 microns, and the gap between the die halves is approximately 100 microns. The wet coating thickness is 37 microns. The concentration by mass of the solid nanostructures is approximately 10%, and the dry film thickness is approximately 600 nm to 1 micron. The coating speed is approximately 300 cm/min. The film was coated and dried at room temperature and 15% relative humidity.

The XRD pattern in FIG. 15 shows the size-reduced nanoparticles coated on an FTO coated glass substrate. The background XRD pattern from the FTO coated glass substrate shows a broad background signal at low angles, and at 2Θ of around 25° from the amorphous glass substrate, and a set of sharp peaks associated with the FTO (e.g., at 2Θ approximately 26.5°, 38°, 51.5°, 61.5° and 65.5°). The scan taken from the nanoparticle coated substrate shows the same broad peaks and FTO peaks from the substrate superimposed with the peaks from the hexagonal tungsten trioxide. The hexagonal tungsten trioxide peak positions in the coated sample are very similar to the peak positions taken from the sample directly after hydrothermal synthesis and washing; no additional peaks are seen indicating that the crystal structure was not altered during the milling process. Peak widths however have clearly broadened indicating that the particle size has been altered in comparison to the as-synthesized particle size. Analysis of the XRD pattern after size reduction indicates that the average crystallite size is approximately 150 nm.

Figure 16:
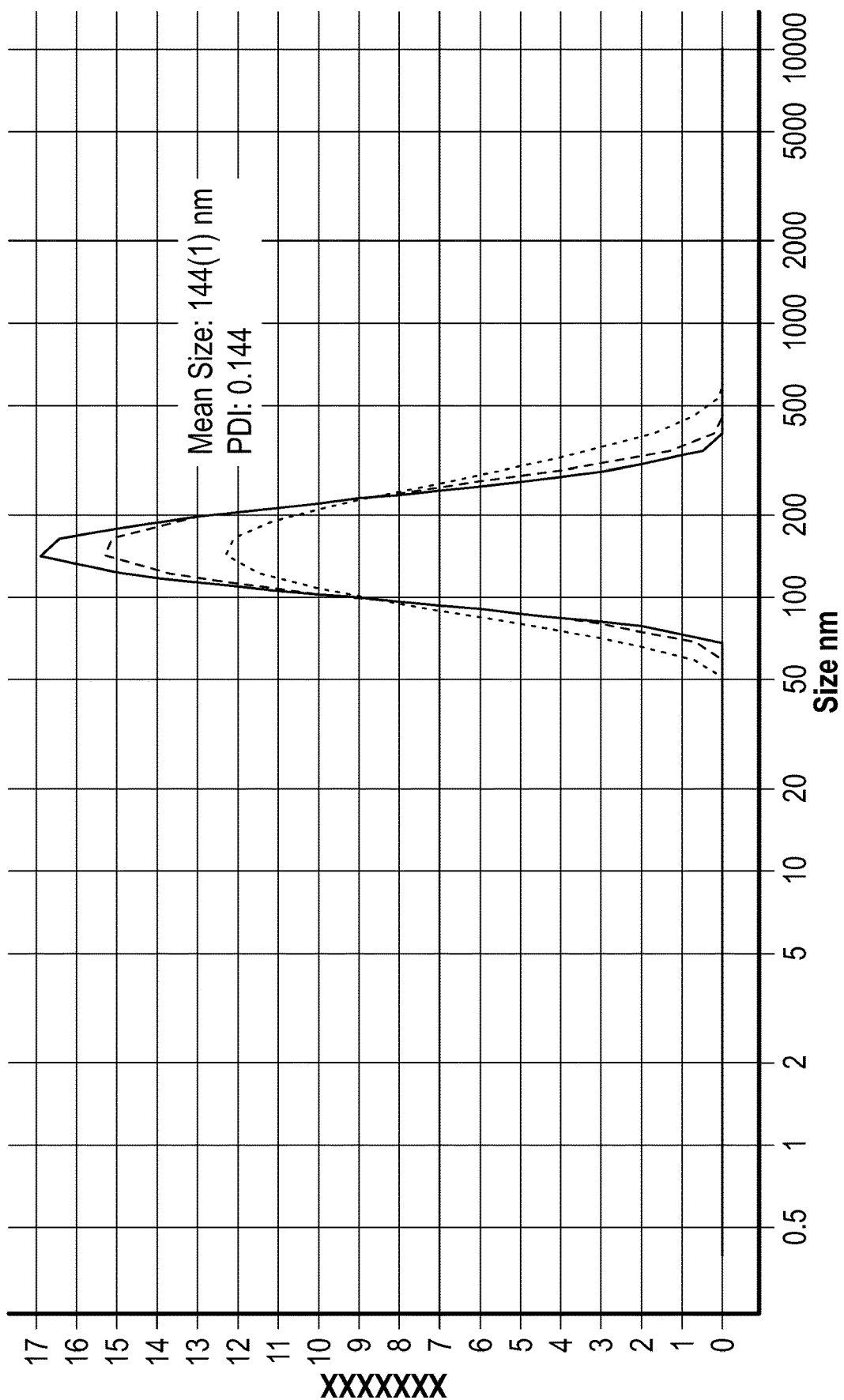
FIG. 16 is a particle size distribution of hexagonal tungsten trioxide after size-reduction.

An example of a hexagonal tungsten trioxide particle size distribution after milling, washing, and separating from the washing contaminants is shown in FIG. 16. The mean particle size in this distribution is 144 nm, and the PDI is 0.144, as measured by DLS.

Example 3

Hexagonal Tungsten Trioxide Nanostructure Thin Film Cathodes

Hexagonal tungsten trioxide nanostructures and inks are prepared by the methods described in Examples 1 and 2.

Devices requiring electrochemical and optical characterization were prepared by coating the hexagonal tungsten trioxide particles on 150×150 mm$^2$ TCO coated PET substrates. The electrochromic testing was performed in a propylene carbonate+1 M LiTFSI (bis(trifluoromethane)sulfonimide lithium) solution with a Li counter electrode. Characteristics of a cathode are included in Table 1.

TABLE 1

| Cathode characteristics | |
|---|---|
| Capacity (mC/cm$^2$) | 32.2 |
| Transmissivity (550 nm), bleached state (%) | 83.7 |
| Transmissivity (550 nm), dark state (%) | 9.3 |
| L (bleached state) | 93.1 |
| a* (bleached state) | 0.7 |
| b* (bleached state) | 5.1 |

Example 4

Synthesis of Prussian blue Nanoparticles and Dispersion

In a 40 mL vial, with stirring, Fe(NO$_3$)$_3$(H$_2$O)$_9$ (16.29 g) was dissolved in water (30.08 mL)—Solution A. In a 250 mL round bottom flask (RBF), with stirring, Na$_4$[Fe(CN)$_6$](H$_2$O)$_{10}$ was dissolved in water (90.03 mL) —Solution B. With vigorous stirring, Solution A was rapidly added (100 mL/h) to Solution B using a syringe pump. The resulting mixture was stirred overnight.

The mixture was centrifuged with water to settle the resulting nanoparticles. After discarding the supernatant in the first centrifugation step (10 min@ 4.4 krpm), the solid was combined with water in a 500 mL RBF. The resulting slurry was sonicated for approximately 30 minutes and then stirred for 1 hour to thoroughly re-suspend the particles. The slurry is then centrifuged (10 min@ 4.4 krpm) and the supernatant is decanted. Additional water is added and the cycle is repeated three times.

After discarding the supernatant from the final centrifugation step, recombine the solids in a 500 mL RBF and rotavap the solid until dry while maintaining the water bath at 45-50° C.

Grind the dry solid to a fine powder using a mortar and pestle. Add the fine powder (5.95 g) to a Na$_4$[Fe(CN)$_6$](H$_2$O)$_{10}$ solution (2.67 g in 110 mL water). The exact mass of added solid will depend upon the level of dehydration achieved above. Stir the solution for 48 hours and filter. The filtrate is then evaporated to dryness by rotovap. A coating solution is created from the final solid by combining with a water-methanol mixture. In a 250-mL RBF, dissolve the solid (3.78 g) in water to prepare a 37.7 g solution. Add 1.16 g methanol to this solution and stir overnight. Sonicate the solution for an hour and filter before coating.

Example 5

Prussian Blue Nanostructure Thin Film Anodes

Prussian blue nanostructures and inks are prepared by the methods described in Example 4.

Devices requiring electrochemical and optical characterization were prepared by coating the Prussian blue inks on 150×150 mm$^2$ TCO coated PET substrates. The electrochromic testing was performed in a propylene carbonate+1 M LiTFSI (bis(trifluoromethane)sulfonimide lithium) solution with a Li counter electrode. Characteristics of an anode are included in Table 2.

TABLE 2

| Anode characteristics | |
|---|---|
| Capacity (mC/cm$^2$) | 11 |
| Transmissivity (550 nm), bleached state (%) | 87 |
| Transmissivity (550 nm), dark state (%) | 41 |
| L (bleached state) | 94 |
| a* (bleached state) | −0.97 |
| b* (bleached state) | 0.7 |

Example 6

Electrochromic Devices Prepared Using Nanostructure Thin Film Cathodes and Anodes Five layer devices were assembled using nanostructure thin film cathodes (as per Example 3) and nanostructure thin film anodes (as per Example 5) on TCO coated PET substrates (150×150 mm). In an inert atmosphere glove box, a Li electrolyte solution was deposited onto the surface of the cathode-containing substrate. The IC formed from the Li electrolyte solution was a solid polymer electrolyte with a dissolved lithium salt. The anode containing substrate was placed upon the electrolyte with an overlap relative to the cathode containing substrate and the entire assembly was laminated. The assembled devices were transferred into an oven, and were further cured. After curing, the devices were measured in a two electrode electrochemical setup combined with an optical light source and spectrometer. Data were obtained by sequential oxidation and reduction under potentiostatic control cycling voltage between 1.5 and −0.9 V, the anode being connected to the positive lead at 25° C. Cycles were switched when the absolute residual current fell below 5 µA. Optical data were recorded every 1-5 s.

Table 3 shows electrochromic data of nanostructure thin film five layer devices. In these examples, the measured charge capacity is larger when the applied cell voltage is higher. After 100 cycles, a nanostructure thin film five layer device shows approximately a 1% capacity loss.

TABLE 3

| Five-layer EC devices and EC data at 25° C. | |
|---|---|
| Capacity (mC/cm$^2$) | 24 |
| Transmissivity (visible), bleached state (%) | 66 |
| L (bleached state) | 84.6 |
| a* (bleached state) | 8.1 |
| b* (bleached state) | −4.8 |

What is claimed is:

1. A monolithic tandem electrochromic device, comprising:
    a central transparent conductor ion blocking layer;
    a first electrochromic multilayer stack arranged on a first surface of the central transparent conductor layer; and
    a second electrochromic multilayer stack arranged on a second surface of the central transparent conductor layer, wherein the second electrochromic multilayer stack comprises:

a second transparent conductor;
a fourth electrochromic layer arranged on the surface of the second transparent conductor;
a second ion conductor layer arranged on the surface of the third electrochromic layer; and
a third electrochromic layer arranged a the surface of the second ion conducting layer;
  wherein the third electrochromic layer is adjacent to the second surface of the central transparent conductor layer, and
wherein the second transparent conductor layer has resistance to current flow substantially parallel to a major surface of a second electrically conductive layer that varies as a function of position within the second electrically conductive layer;
  wherein the central transparent conductor layer comprises ion conductivities between $10^{-4}$ and $10^{-20}$ S/cm, and electrical resistivity less than 100 Ohm-cm.

2. The monolithic tandem electrochromic device of claim 1, wherein:
the central transparent conductor layer comprises:
  electrical resistivity less than 100 Ohm-cm in the lateral direction; and
  a flexible transparent film coated with central transparent conductor layers on both sides, and
wherein the tandem monolithic electrochromic device comprises an electrically conductive member forming an electrical connection between the central transparent conductor layers.

3. The monolithic tandem electrochromic device of claim 1, wherein:
the central transparent conductor layer comprises electrical resistivity less than 100 Ohm-cm in the vertical direction; and
the central transparent conductor layer material is selected from the group consisting of conductive nanowires embedded in a polymer, and conductive nanoparticles embedded in a polymer.

4. The monolithic tandem electrochromic device of claim 1, wherein the first electrochromic multilayer stack comprises:
a first transparent conductor layer;
a first electrochromic layer arranged on the surface of the first transparent conductor;
a first ion conductor layer arranged on the surface of the first electrochromic layer; and
a second electrochromic layer arranged on the surface of the first ion conducting layer;
  wherein the second electrochromic layer is adjacent to the first surface of the central transparent conductor layer, and
  wherein the first transparent conductor layer has resistance to current flow substantially parallel to a major surface of a first electrically conductive layer that varies as a function of position within the first electrically conductive layer.

5. The monolithic tandem electrochromic device of claim 4, wherein the second electrochromic layer comprises an electrochromic cathode layer comprising crystalline cathodic electrochromic nanostructures, wherein electrochromic cathode layer does not comprise a binder.

6. The monolithic tandem electrochromic device of claim 5, wherein the third EC layer comprises an electrochromic cathode layer comprising crystalline cathodic electrochromic nanostructures, wherein electrochromic cathode layer does not comprise a binder.

7. The monolithic tandem EC device of claim 1, further comprising:
a first outer substrate adjacent to a first transparent conductor layer; and
a second outer substrate adjacent to a fourth transparent conductor layer,
wherein a first and second outer substrate material is selected from a group consisting of glass and plastic.

8. A monolithic tandem electrochromic device, comprising:
a central transparent conductor layer;
a first electrochromic multilayer stack arranged on a first surface of the central transparent conductor layer;
a second electrochromic multilayer stack arranged on a second surface of the central transparent conductor layer; wherein:
  the central transparent conductor layer comprises:
    an electrical resistivity less than 100 Ohm-cm in the lateral direction; and
    a flexible transparent film coated with central transparent conductor layers on both sides;
  the tandem monolithic electrochromic device comprises an electrically conductive member forming an electrical connection between central transparent conductor layers;
  the first electrochromic multilayer stack comprises:
    a first transparent conductor layer;
    a first electrochromic layer arranged on the surface of the first transparent conductor layer;
    a first ion conductor layer arranged on the surface of a first electrochromic layer; and
    a second electrochromic layer arranged a the surface of the first ion conducting layer;
      wherein the second electrochromic layer is adjacent to the first surface of the central transparent conductor layer, and
      wherein the first transparent conductor layer has resistance to current flow substantially parallel to a major surface of the first electrically conductive layer that varies as a function of position within a first electrically conductive layer;
  the second electrochromic multilayer stack comprises:
    a second transparent conductor;
    a fourth electrochromic layer arranged on the surface of the second transparent conductor;
    a second ion conductor layer arranged on the surface of the third electrochromic layer; and
    a third electrochromic layer arranged a the surface of the second ion conducting layer;
      wherein the third electrochromic layer is adjacent to the second surface of the central transparent conductor layer, and
      wherein the second transparent conductor layer has resistance to current flow substantially parallel to a major surface of a second electrically conductive layer that varies as a function of position within the second electrically conductive layer.

9. A method of producing a monolithic tandem electrochromic device, comprising:
providing central transparent conductor layer;
providing a first electrochromic multilayer stack (1002);
providing a second electrochromic multilayer stack (1003);
arranging the first electrochromic multilayer stack on a first surface of the central transparent conductor layer; and arranging the second electrochromic multilayer stack on a second surface of the central transparent conductor layer, wherein the second electrochromic multilayer stack comprises:
a second transparent conductor;
a fourth electrochromic layer arranged on the surface of the second transparent conductor;
a second ion conductor layer arranged on the surface of the third electrochromic layer; and
a third electrochromic layer arranged a the surface of the second ion conducting layer;
wherein the third electrochromic layer is adjacent to the second surface of the central transparent conductor layer, and
wherein the second transparent conductor layer has resistance to current flow substantially parallel to a major surface of a second electrically conductive layer that varies as a function of position within the second electrically conductive layer
wherein the central transparent conductor layer comprises ion conductivities between $10^{-4}$ and $10^{-20}$ S/cm, and electrical resistivity less than 100 Ohm-cm.

10. The method of claim 9, wherein the central transparent conductor layer comprises electrical resistivity less than 100 Ohm-cm in the lateral direction and a flexible transparent film coated with central transparent conductor layers on both sides.

11. The method of claim 9, wherein the central transparent conductor layer comprises electrical resistivity less than 100 Ohm-cm in the vertical direction, and a material selected from the group consisting of conductive nanowires embedded in a polymer, and conductive nanoparticles embedded in a polymer.

12. The method of claim 9, wherein the first electrochromic multilayer stack comprises:
a first electrochromic layer;
a first ion conducting layer;
a second electrochromic layer; and
a first transparent conductor layer, wherein
the first transparent conducting layer comprises a resistance to current flow substantially parallel to a major surface of the first electrically conductive layer that varies as a function of position within the first electrically conductive layer.

13. The method of claim 12, wherein the second electrochromic layer comprises an electrochromic cathode layer comprising crystalline cathodic electrochromic nanostructures, wherein electrochromic cathode layer does not comprise a binder.

14. The method of claim 13 wherein the third electrochromic layer comprises an electrochromic cathode layer comprising crystalline cathodic electrochromic nanostructures, wherein electrochromic cathode layer does not comprise a binder.

15. A method of producing a monolithic tandem electrochromic device, comprising:
providing a first electrochromic sub-stack, comprising:
providing a first outer substrate;
depositing a first transparent conductor on a surface of the first outer substrate;
depositing a first EC layer on the surface of the first transparent conductor;
providing a central sub-stack, comprising:
providing central transparent conductor layer;
depositing a second electrochromic layer on one side of the central transparent conductor layer;
depositing a third electrochromic layer on the other side of the central transparent conductor layer;
providing a second electrochromic sub-stack, comprising:
providing a second outer substrate;
depositing a second transparent conductor on a surface of the second outer substrate;
depositing a fourth EC layer on the surface of the second transparent conductor;
connecting the first electrochromic sub-stack to the central sub-stack using a first ion conductor layer arranged between the first electrochromic layer and the second electrochromic layer; and
connecting the second electrochromic sub-stack to the central sub-stack using a second ion conducting layer arranged between the third electrochromic layer and the second electrochromic layer to form the monolithic tandem electrochromic device.

16. The method of claim 15, further comprising:
providing a plurality of crystalline cathodic electrochromic particles; and
size-reducing the crystalline cathodic electrochromic particles by grinding to produce crystalline cathodic electrochromic nanostructures;
wherein the depositing the second electrochromic layer and the depositing the third electrochromic layer comprise coating the crystalline cathodic electrochromic nanostructures onto the central transparent conductor ion blocking layer.

17. The method of claim 16, wherein the second electrochromic layer and the third electrochromic layer do not comprise a binder.

18. The method of claim 15, wherein the central transparent conductor layer comprises a flexible transparent film coated with central transparent conductor layers on both sides.

19. The method of claim 15, wherein the central transparent conductor layer material is selected from the group consisting of conductive nanowires embedded in a polymer, and conductive nanoparticles embedded in a polymer.

20. The method of claim 15, wherein the connecting the first electrochromic sub-stack to the central sub-stack using the first ion conductor layer comprises laminating the first electrochromic sub-stack to the central sub-stack using the first ion conductor layer as the lamination layer.

21. The method of claim 15, wherein the connecting the second electrochromic sub-stack to the central sub-stack using the second ion conductor layer comprises laminating the first electrochromic sub-stack to the central sub-stack using the second ion conductor layer as the lamination layer.

* * * * *